Aug. 27, 1963

M. A. MEYER 3,102,263

DOPPLER RADAR SYSTEM

Filed Sept. 10, 1956

INVENTOR
MAURICE A. MEYER

BY *Joseph Weingarten*
ATTORNEY

FIG. 3

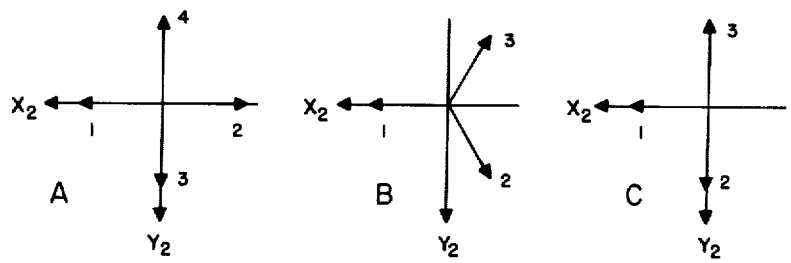

FIG. 5

| | | |
|---|---|---|
| A | $V_Y (D_Z, D_Y)$<br>$V_X (D_X, D_Z, D_Y)$<br>$V_Z (D_X, D_Z, D_Y)$ | $V_Y = \sin R \cdot D_Z + \cos R \cdot D_Y$<br>$V_X = \cos P \cdot D_X + (\cos R \cdot D_Z - \sin R \cdot D_Y) \sin P$<br>$V_Z = \sin P \cdot D_X + (\cos R \cdot D_Z - \sin R \cdot D_Y) \cos P$ |
| B | $V_Y (D_Z, D_Y)$<br>$V_X (D_X, D_Z, V_Y)$<br>$V_Z (D_Z, V_X, V_Y)$ | $V_Y = \sin R \cdot D_Z + \cos R \cdot D_Y$<br>$V_X = \cos P \cdot D_X + \dfrac{\sin P}{\cos R} \cdot D_Z - \tan R \sin P \cdot V_Y$<br>$V_Z = \sec R \sec P \cdot D_Z - \tan P \cdot V_X - \tan R \sec P \cdot V_Y$ |
| C | $V_Y (D_Z, D_Y)$<br>$V_Z (D_X, D_Z, D_Y)$<br>$V_X (D_X, V_Z)$ | $V_Y = \sin R \cdot D_Z + \cos R \cdot D_Y$<br>$V_Z = \dfrac{\cos P}{\cos R} \cdot D_Z - \sin P \cdot D_X - \tan R \cos P \cdot V_Y$<br>$V_X = \sec P \cdot D_X + \tan P \cdot V_Z$ |

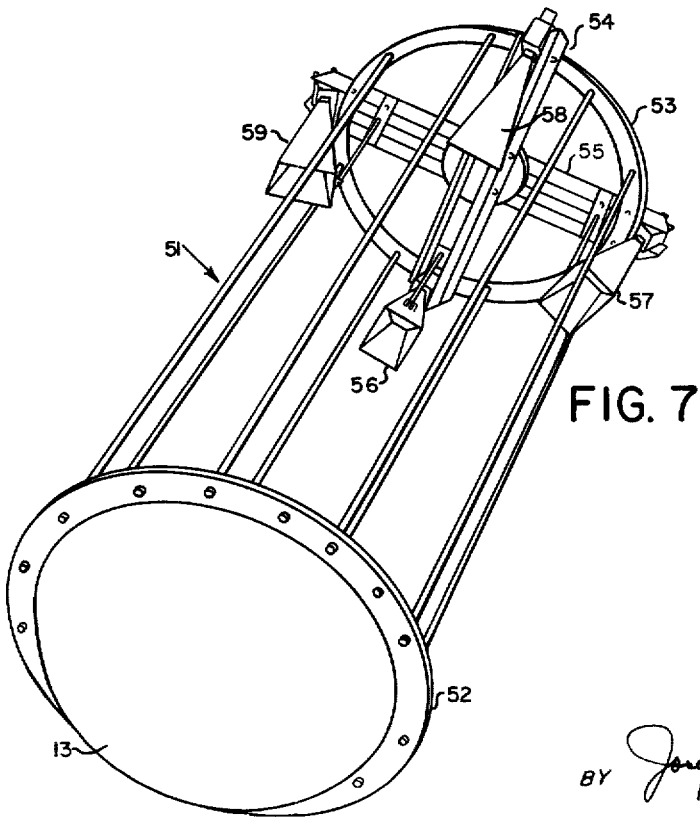

FIG. 7

INVENTOR
MAURICE A. MEYER

Aug. 27, 1963   M. A. MEYER   3,102,263
DOPPLER RADAR SYSTEM
Filed Sept. 10, 1956   8 Sheets-Sheet 3

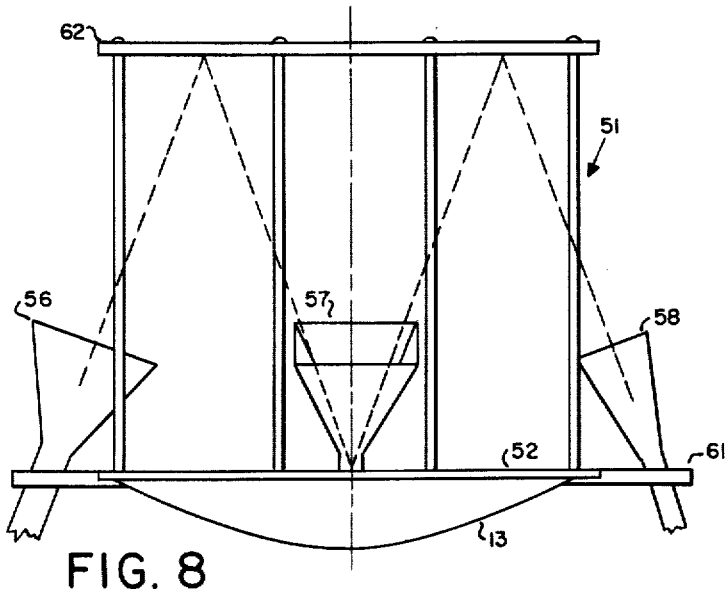

|  | FOUR BEAMS | THREE BEAMS SPACED 120° | THREE BEAMS SPACED 90° |
|---|---|---|---|
| $D_X =$ | $\dfrac{K(f_{d1} - f_{d2})}{2 \cos \theta}$ | $\dfrac{K(2f_{d1} - f_{d2} - f_{d3})}{3 \cos \theta}$ | $\dfrac{K(2f_{d1} - f_{d2} - f_{d3})}{2 \cos \theta}$ |
| $D_Y =$ | $\dfrac{K(f_{d3} - f_{d4})}{2 \cos \theta}$ | $\dfrac{K(f_{d2} - f_{d3})}{\sqrt{3} \cos \theta}$ | $\dfrac{K(f_{d2} - f_{d3})}{2 \cos \theta}$ |
| $D_Z =$ | $\dfrac{-K(f_{d1} + f_{d2})}{2 \sin \theta}$ | $\dfrac{-K(f_{d1} + f_{d2} + f_{d3})}{3 \sin \theta}$ | $\dfrac{-K(f_{d2} + f_{d3})}{2 \sin \theta}$ |

SYMBOLS $f_{d1}$
$f_{d2}$
$f_{d3}$  DOPPLER FREQ. SHIFTS ASSOCIATED WITH THE RESPEC-
$f_{d4}$  TIVE BEAMS $D_X$
$D_Y$  GENERALIZED DOPPLER VARIABLES FOR THE THREE TRANSLATIONAL
$D_Z$  MOTIONS

K — PROPORTIONALITY CONSTANT
R — ROLL ANGLE
P — PITCH ANGLE $V_X$ — HEADING VELOCITY ⎤ REFERRED TO
$V_Y$ — DRIFT VELOCITY   ⎬ PLATFORM SPACE
$V_Z$ — CLIMB VELOCITY   ⎦ COORDINATES

B

$D_X = \cos P \cdot V_X - \sin P \cdot V_Z$ $D_Y = -\sin P \cdot \sin R \cdot V_X + \cos R \cdot V_Y - \cos P \cdot \sin R \cdot V_Z$ $D_Z = \sin P \cdot \cos R \cdot V_X + \sin R \cdot V_Y + \cos P \cdot \cos R \cdot V_Z$

FIG. 4

INVENTOR
MAURICE A. MEYER

BY Joseph Weingarten
ATTORNEY

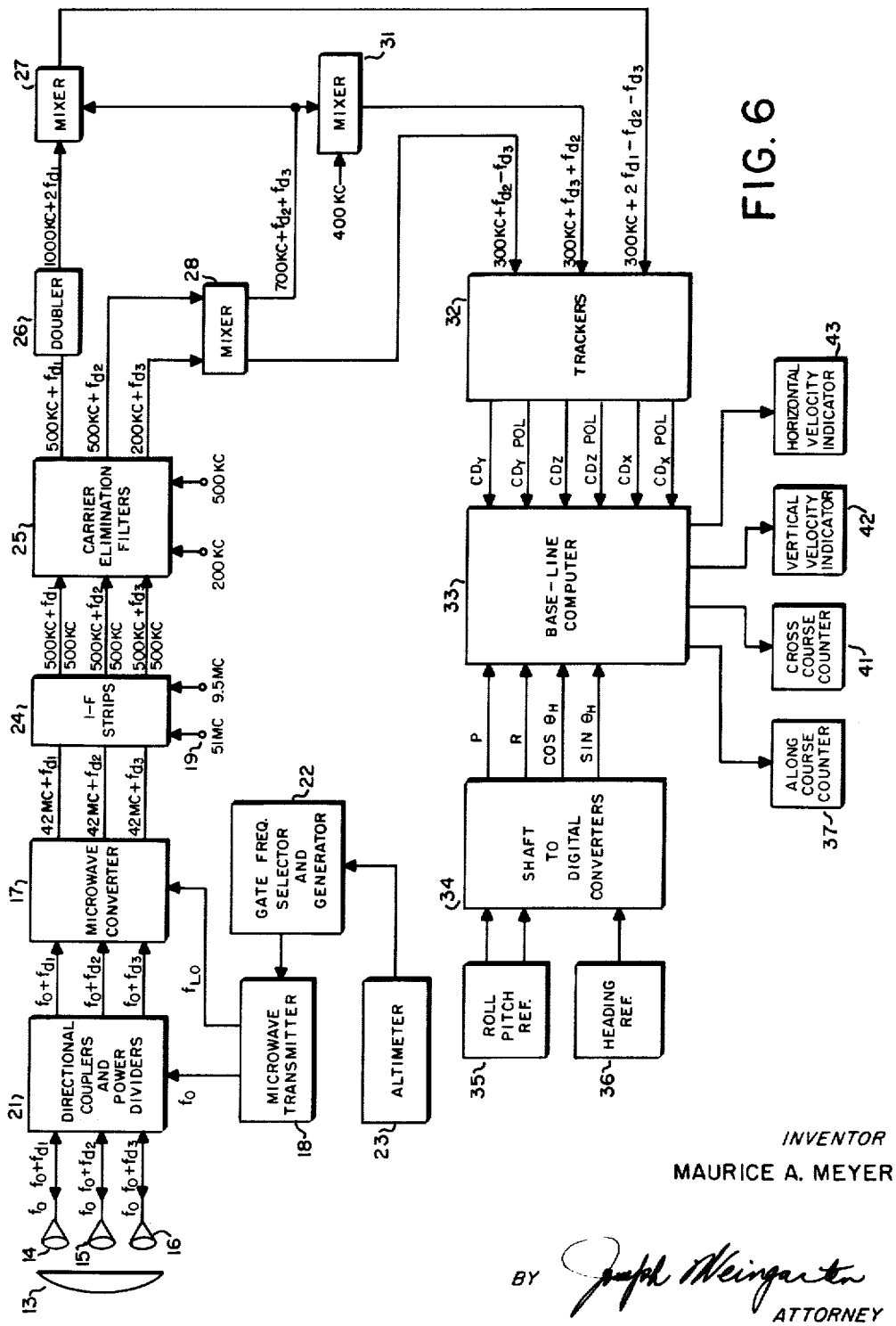

Aug. 27, 1963                M. A. MEYER                3,102,263
                          DOPPLER RADAR SYSTEM
Filed Sept. 10, 1956                                8 Sheets-Sheet 6

INVENTOR
MAURICE A. MEYER

BY *Joseph Weingarten*
ATTORNEY

Aug. 27, 1963    M. A. MEYER    3,102,263
DOPPLER RADAR SYSTEM
Filed Sept. 10, 1956    8 Sheets-Sheet 7

INVENTOR
MAURICE A. MEYER
BY *Joseph Weingarten*
ATTORNEY

Aug. 27, 1963    M. A. MEYER    3,102,263
DOPPLER RADAR SYSTEM
Filed Sept. 10, 1956    8 Sheets-Sheet 8
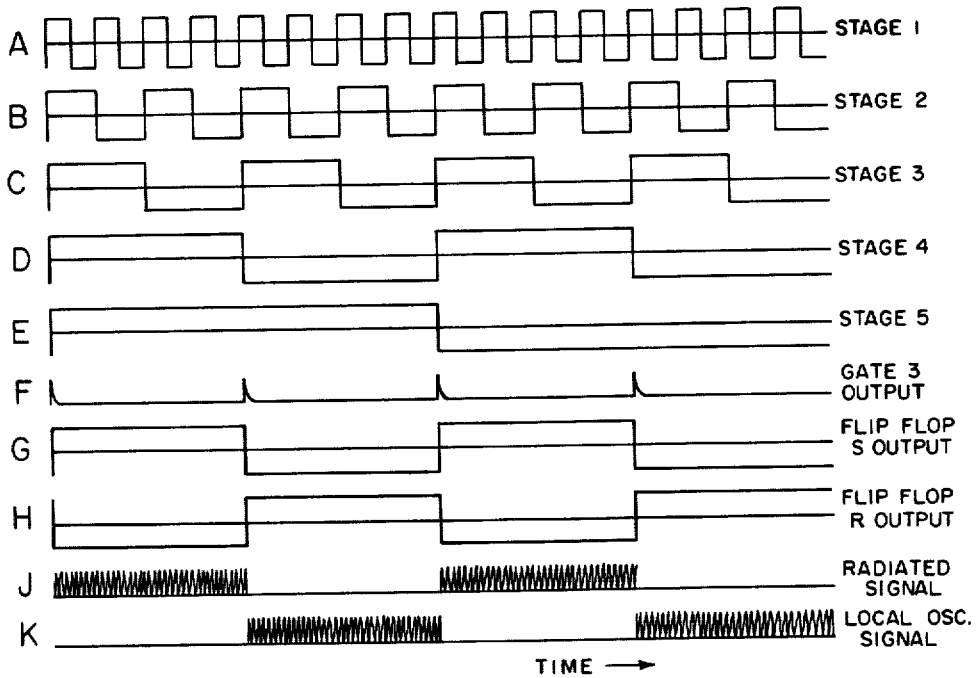
FIG. 13
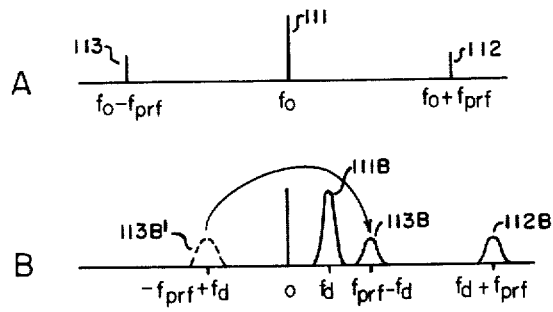
FIG. 14
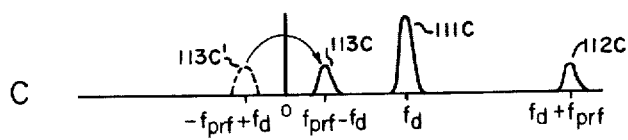
INVENTOR
MAURICE A. MEYER
BY Joseph Weingarten
ATTORNEY United States Patent Office
3,102,263
Patented Aug. 27, 1963

3,102,263
DOPPLER RADAR SYSTEM
Maurice A. Meyer, Natick, Mass., assignor to Laboratory for Electronics, Inc., Boston, Mass., a corporation of Delaware
Filed Sept. 10, 1956, Ser. No. 610,444
26 Claims. (Cl. 343—8)

This invention relates in general to radar apparatus, and in particular to a Doppler radar navigational system especially suitable for use aboard aircraft. The system herein described is capable of sensing and indicating the magnitude and direction of aircraft movement regardless of how slight or what direction such movement takes. It is compact, lightweight, and sufficiently sensitive to be utilized as a hovering indicator in a helicopter yet is still capable of responding to the relatively high Doppler frequency shifts associated with the supersonic velocities of jet aircraft and rocket powered missiles.

Fundamentally, Doppler navigational systems are based on the physical principle that the relative movement between a source of cyclical energy waves and a receiver produces an apparent change of frequency in the wave received by the latter. Where the source and the receiver are at the same point in relative motion to a reflecting object and the energy is electromagnetic, the measured Doppler shift of the received wave is $$f_\mathrm{d} = \frac{2f_0}{c} V \cos \phi$$

where $f_0$ is the transmitted frequency, $c$ is the velocity of light, $V$ is the relative velocity between source and reflecting object, and $\phi$ is the angle between the velocity vector and the direction of propagation of the radiated energy.

The application of this principle for the determination of vehicle velocities relative to a fixed point is well known and widely used. For example, along the highways the principle is employed for the determination of automobile speeds. Doppler navigational systems for large piston engined fixed wing aircraft are also known; however, the requirements are not as stringent as those which a helicopter or jet aircraft navigating system must satisfy. Considerations of the characteristics of the various types of aircraft readily explains this difference. A fixed wing piston engined aircraft continuously moves forward at a medium, substantially constant velocity, while a helicopter may move forward, backward, sideways or hover at substantially zero velocity, and jet aircraft frequently travel at supersonic speeds. Even when moving forward, the speed of a helicopter is appreciably smaller than that of the usual fixed wing aircraft. Since the Doppler frequency shift, $f_\mathrm{d}$, is proportional to the magnitude of velocity, it follows that for a given source frequency, a smaller deviation will be observed from a system aboard a helicopter than from a system transported by a fixed wing aircraft with piston engines. Thus, not only must the helicopter Doppler system retain the sense of the Doppler shift in order to determine whether the helicopter is moving backwards or forward, left or right, but also accurately sense a relatively small change in frequency. Yet, the relatively small pay load of a helicopter dictates a requirement that the apparatus be compact and lightweight. The latter requirement is also present in jet fighter aircraft navigational systems and, as a matter of fact, always desirable. Furthermore, such systems for use aboard high speed aircraft must be capable of responding to the resulting relatively high Doppler frequency shifts.

Basically, a single beam airborne Doppler system includes a microwave radar transmitter which radiates a beam of microwave energy along the direction of the aircraft flight path oriented at a fixed angle relative to the vertical axis of the aircraft and means for receiving the reflected beam energy and determining the change in frequency. The Doppler frequency shift is proportional to the projection of the aircraft velocity vector onto the direction of electromagnetic radiation. Conversely, a measure of this velocity is the ratio of the measured Doppler frequency shift to the transmitted frequency divided by the cosine of the angle between the velocity vector and the beam. Since the actual track of the aircraft does not normally coincide with its heading because of wind velocity components orthogonal to the desired track, it is desirable to have another beam oriented so that the reflected signal is indicative of the aircraft velocity orthogonal to its heading. Then, by combining these two components of velocity with reference to the aircraft heading as indicated by a gyro compass or other suitable instrument, and referring to the aircraft's starting point, the aircraft position may be computed.

The nature of helicopter flight behavior is such that problems are introduced not normally encountered in fixed wing installations. While a fixed wing aircraft is relatively stable in level point-to-point flight, a helicopter is subject to relatively wide variations in attitude, describable as roll and pitch variations. A factor in these variations is the relatively long time lag between a control movement by the pilot and the response of the helicopter to such movement. The effect of these variations is that the orientation of the beams relative to a vertical axis of space coordinates referred to the earth changes as the helicopter rolls and pitches. Accordingly, the accuracy of the helicopter position and velocity indication in the horizontal plane is increased by sensing and utilizing roll and pitch variations in determining velocity and position.

To facilitate roll and pitch compensation, a preferred system includes more than two beams. For example, consider a system having beams directed fore and aft and left and right. Then, when the aircraft pitches such that the nose rises while the tail is depressed, a corresponding increase and decrease in the Doppler frequency shift of the forward and rearward beams respectively is electronically sensed and utilized in making the actual determination of the horizontal velocity. In a similar manner, frequency shifts due to roll are sensed by apparatus responsive to Doppler shifts from the side beams.

It is well known in the art that the return signal having the Doppler frequency shift is in the form of a band of frequencies rather than a single frequency. The band width of the return spectrum is functionally related to both antenna beam width and the magnitude of the Doppler shift itself. Accordingly, the detector design problem and inherent computation errors are reduced by maintaining antenna beam widths as narrow as possible. Furthermore, the antenna gain achieved by any narrowing of beam width is effective in improving the signal-to-noise ratio at the receiver and reducing the radiated power required to attain a given degree of reliability.

Conventional techniques for radiating such narrow beams involves the use of a horn and parabolic reflector of the type used in conventional radar sets. Such antennas are bulky and introduce undesirable aerodynamic effects when allowed to protrude from the skin of the aircraft. Another approach for determining velocity components in the selected plurality of directions while still maintaining the desired narrow beam width involves the use of a single radiator which scans in azimuth; however, the bulk, weight, and power consumption of the scanning mechanism is undesirable. The two suggested antenna systems further require a radome to protect the elements from the weather and reduce undesirable aerodynamic characteristics.

Accordingly, it is a primary object of the present invention to provide a lightweight compact airborne Doppler navigational system wherein a plurality of microwave pencil beams are radiated and the reflected energy therefrom received and processed to provide accurate indication of the aircraft position and/or velocity.

Another object of the invention is to provide a system which radiates the desired pencil beams without the need for a protective radome and introduces negligible deterioration of the aerodynamic characteristics of the aircraft surfaces.

Another object of the invention is the provision of a lightweight microwave lens which focuses the plurality of radiated and received beams in the desired manner.

A further object of the invention is to provide a receiver-transmitter time-shared Doppler navigation system sensitive to substantially all magnitudes of velocities likely to be encountered in flight and capable of usefully detecting reflected signals from all types of terrain and water surfaces.

Still a further object of the invention is the provision of efficient directional coupling and power distribution means for energizing all the beam radiators from a source of microwave energy and directing the reflected energy to appropriate receiving means.

An object of the invention is the provision of novel means for deriving both the transmitted microwave signal and the local oscillator signal for the microwave receiver from the same microwave oscillator in a manner which precludes carrier leakage from interfering with reception of reflected signals by the microwave receiver.

Another object of the invention is the provision of novel means for rendering the transmitter and receiver operative during mutually exclusive time intervals whereby the transmitted signal is completely cut off during the intervals the receiver is on.

Another object of the invention is to provide a Doppler navigational system which, though compact and lightweight, accurately indicates the position of a helicopter and/or yields an indication of the magnitude and direction of velocity to an accuracy of such a high degree that the helicopter may be hovered by referring only to the velocity indicating means.

Other features, objects and advantages of the invention will become apparent from the following specification when read in connection with the accompanying drawing in which:

FIGS. 3A, 3B and 3C are projections in the horizontal plane of various multi-beam arrangements suitable for use in connection with Doppler navigational systems;

FIG. 4A is a table of the equations which relate the Doppler frequency shifts present in the respective reflected beams in the various configurations of FIG. 3 to the generalized Doppler variables for the three translational motions;

FIG. 4B is a table relating the generalized Doppler variables to the velocity components referred to the space platform taking into account the roll and pitch of the helicopter;

FIG. 5 is a table of equations functionally relating each velocity component in the form of dependent variables to the generalized Doppler variables;

FIG. 6 is a block diagram of a representative embodiment of a Doppler navigational system utilizing a microwave lens in a three beam system;

FIG. 7 illustrates an arrangement for focusing four beams, whose projections in the horizontal plane are orthogonal, with a microwave lens;

FIG. 8 illustrates a more compact microwave lens radiating system utilizing a reflector in cooperation with the lens;

FIG. 13 is a graphical representation of signal waveforms pertinent to understanding the system of FIG. 12; and FIG. 14 is a graphical representation of the frequency spectra of transmitted and reflected signals to clarify the phenomenon of spectrum foldover.

Figure 1:
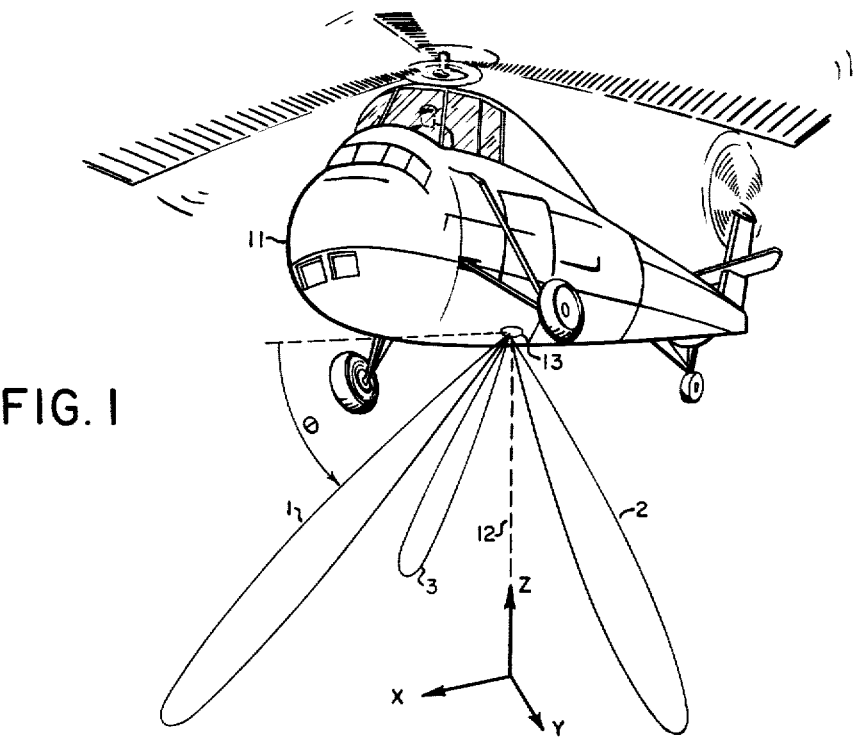
FIG. 1 illustrates a three beam configuration emanating from the microwave lens set in the underside of a helicopter.

With reference now to the drawing and more particularly FIG. 1 thereof, a helicopter is illustrated in level flight with apparatus aboard radiating a pencil beam 1 forward, a second pencil beam 2 to the left and a third pencil beam 3 to the right through microwave lens 13. The term "pencil beam" is defined on page 413 in chapter 12 of volume 12 of the M.I.T. Radiation Laboratory Series, entitled "Microwave Antenna Theory and Design." All three beams are illustrated depressed whereby the angle between the beams and the horizontal plane of the aircraft is $\theta$. The direction of heading which the helicopter desires to fly is designated the X axis, the vertical axis is designated the Z axis, and orthogonal to the X and Z axes is the Y axis; that is, motion along the latter axis represents sidewise movement of the helicopter relative to the desired heading. Not only are the radiated beams focused by the microwave lens 13 disposed on the underside of the helicopter 11, but the lens also serves to focus energy returned from the respective beams upon respective horns. By combining the Doppler frequency shift information from the three beams, the known orientation of the beams relative to the helicopter, and the roll and pitch of the helicopter, velocity components along the X, Y and Z axes may be determined. Application to a computer of signals characteristic of the velocities thus determined in conjunction with a heading information signal derived from apparatus such as a gyro compass, enables an accurate determination to be made of the aircraft position relative to a fixed point. This position indication may be manifested in terms of latitude and longitude or in distance along and deviations right and left of a selected course line. Suitable means may also be provided for indicating the direction and magnitude of velocity. The latter information is especially useful to the pilot when endeavoring to hover and control the helicopter.

The velocities sought to be determined are preferably referred to the fixed geographical axes of the earth. However, the beams are preferably fixed relative to the aircraft, for otherwise costly, heavy power-consuming leveling apparatus would be required to maintain the beam angular orientation unchanged relative to the X, Y, Z axes in space. Hence, a determination of the helicopter pitch and roll is desirable for accurate instantaneous computation of the aircraft velocity relative to the earth. An understanding of this computation will be facilitated by referring to FIG. 2.

Figure 2B:
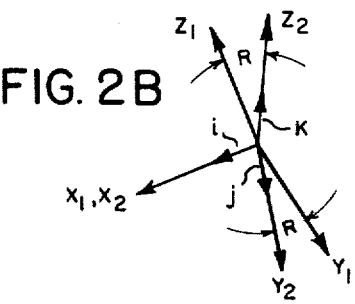
FIGS. 2A and 2B represent shifts in the coordinate axes of the helicopter of FIG. 1 resulting from roll and pitch.
Figure 2A:
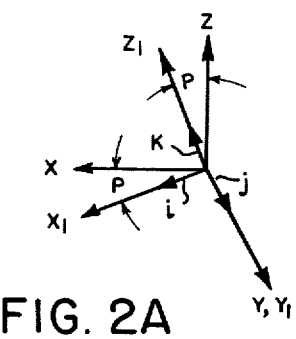

In FIG. 2A the effect of helicopter pitch in rotating the fore and aft axis of the helicopter about the athwartship or Y axis is illustrated, the axes of the helicopter in level flight coinciding with the X, Y, Z axes in space. When the helicopter pitches through an angle P, the Y axis retains its original orientation but the X and Z axis now move to new positions denoted as $X_1$ and $Z_1$.

In FIG. 2B, the results of aircraft roll about the longitudinal axis, represented as $X_1$ after the aircraft has pitched through an angle of P, is illustrated. After rolling through an angle R, the $X_1$ axis retains its original orientation, however, the $Z_1$ and $Y_1$ axes are rotated into new positions represented by $Z_2$ and $Y_2$. In order to properly indicate the aircraft velocity relative to geographical coordinates, the computing apparatus utilizes roll, pitch and heading information derived from inertial elements in conjunction with the Doppler frequency shifts received in the reflected microwave beams to provide an accurate indication of the velocity. Effectively, this computation involves transforming the Doppler frequency shifts characteristic of velocity components along the $X_2$, $Y_2$, $Z_2$ axes of the helicopter into velocity components along the X, Y, Z axes of the level aircraft. The matrix algebra which follows is a convenient means for deriving the relations which convert velocity components along the former axes to components along the latter in terms of the angular roll and pitch of the aircraft.

Having an orthogonal set of space axes, X, Y, and Z, and a first rotation about the Y axis through an angle of pitch P as illustrated in FIG. 2A, a first transformation is made by expressing unit vectors $\bar{i}$, $\bar{j}$, and $\bar{k}$ along the X, Y, and Z axes respectively in terms of their components along the new $X_1$, $Y_1$, $Z_1$ axes.

$$X_1 = \cos P \cdot X + 0 \cdot Y - \sin P \cdot Z$$
$$Y_1 = 0 \cdot X + 1 \cdot Y + 0 \cdot Z$$
$$Z_1 = \sin P \cdot X + 0 \cdot Y + \cos P \cdot Z$$

Expressed in matrix algebra $$\begin{bmatrix} X_1 \\ Y_1 \\ Z_1 \end{bmatrix} = [M_1] \begin{bmatrix} X \\ Y \\ Z \end{bmatrix}$$

where $$[M_1] = \begin{bmatrix} \cos P & 0 & -\sin P \\ 0 & 1 & 0 \\ \sin P & 0 & \cos P \end{bmatrix}$$

The second rotation about the $X_1$ axis through the roll angle R yields:

$$X_2 = 1 \cdot X_1 + 0 \cdot Y_1 - 0 \cdot Z_1$$
$$Y_2 = 0 \cdot X_1 + \cos R \cdot Y_1 - \sin R \cdot Z_1$$
$$Z_2 = 0 \cdot X_1 + \sin R \cdot Y_1 + \cos R \cdot Z_1$$

or in matrix form $$\begin{bmatrix} X_2 \\ Y_2 \\ Z_2 \end{bmatrix} = [M_2] \begin{bmatrix} X_1 \\ Y_1 \\ Z_1 \end{bmatrix}$$

where $$[M_2] = \begin{bmatrix} 1 & 0 & 0 \\ 0 & \cos R & -\sin R \\ 0 & \sin R & \cos R \end{bmatrix}$$

Since $$\begin{bmatrix} X_1 \\ Y_1 \\ Z_1 \end{bmatrix} = [M_1] \begin{bmatrix} X \\ Y \\ Z \end{bmatrix}$$

$$\begin{bmatrix} X_2 \\ Y_2 \\ Z_2 \end{bmatrix} = [M_2] [M_1] \begin{bmatrix} X \\ Y \\ Z \end{bmatrix}$$

Let $$[M] = [M_2] [M_1]$$

Then, $$[M] = \begin{bmatrix} 1 & 0 & 0 \\ 0 & \cos R & -\sin R \\ 0 & \sin R & \cos R \end{bmatrix} \begin{bmatrix} \cos P & 0 & -\sin P \\ 0 & 1 & 0 \\ \sin P & 0 & \cos P \end{bmatrix}$$

or $$[M] = \begin{bmatrix} \cos P & 0 & -\sin P \\ -\sin R \cdot \sin P & \cos R & -\sin R \cdot \cos P \\ \cos R \cdot \sin P & \sin R & \cos R \cdot \cos P \end{bmatrix}$$

$$|[M]| = \cos P(\cos^2 R \cos P + \sin^2 R \cos P) - 0$$
$$- \sin P(-\sin^2 R \sin P - \cos^2 R \sin P)$$
$$= \cos^2 P(\sin^2 R + \cos^2 R) + \sin^2 P(\sin^2 R + \cos^2 R) = 1$$

Since $|[M]| = 1$, $[M]_{\mathrm{I}} = [M]_{\mathrm{T}}$, the subscripts I and T respectively denoting the inverse and transpose of the matrix. Hence, $$[M]_{\mathrm{I}} = \begin{bmatrix} \cos P & -\sin R \cdot \sin P & \cos R \cdot \sin P \\ 0 & \cos R & \sin R \\ -\sin P & -\sin R \cdot \cos P & \cos R \cdot \cos P \end{bmatrix}$$

and $$\begin{bmatrix} X \\ Y \\ Z \end{bmatrix} = [M]_{\mathrm{I}} \begin{bmatrix} X_2 \\ Y_2 \\ Z_2 \end{bmatrix}$$

The matrix derived above, transforming quantities referred to the platform axes of the rolling pitching helicopter to its axes in normal flight attitude, is useful in connection with deriving the equations in the tables of FIGS. 4A and 4B. As an example of such derivation, the equations related to the three beam configuration of FIG. 3C will be considered and the generalized Doppler variables $D_x$, $D_y$ and $D_z$ determined.

The Doppler frequency shift, $f_d$, associated with an antenna beam defined by $\bar{B}$, a unit vector oriented along the direction of propagation, is described by $$K f_d = \bar{V} \cdot \bar{B}$$

The velocity is preferably referred to the fixed X, Y, Z axes; the beams, to the $X_2$, $Y_2$, $Z_2$ axes of the rolling and pitching platform to which they bear a fixed relation. To carry out the dot product, the components of $\bar{B}$ are referred to the X, Y, Z axes by means of the transformation matrix $[M]_{\mathrm{I}}$.

With the three beams depressed from the horizontal plane of the aircraft by the angle $\theta$ indicated in FIG. 1, the Doppler frequency shift associated with each beam may be expressed as:

(a) $\quad K f_{d_1} = [V_x V_y V_z] \, [M]_{\mathrm{I}} \begin{bmatrix} \cos \theta \\ 0 \\ -\sin \theta \end{bmatrix}$ (b) $\quad K f_{d_2} = [V_x V_y V_z] \, [M]_{\mathrm{I}} \begin{bmatrix} 0 \\ \cos \theta \\ -\sin \theta \end{bmatrix}$ (c) $\quad K f_{d_3} = [V_x V_y V_z] \, [M]_{\mathrm{I}} \begin{bmatrix} 0 \\ -\cos \theta \\ -\sin \theta \end{bmatrix}$ the latter column matrices representing the components of the respective unit vectors $\bar{B}_1$, $\bar{B}_2$, $\bar{B}_3$ along the $X_2$, $Y_2$, $Z_2$ axes.

By subtracting the sum of (b) and (c) from twice (a), (c) from (b), adding (b) to (c) and factoring out the appropriate trigonometric functions from the column matrices derived by such combinations, $2(a) - (b) + (c)$ $$\frac{K(2f_{d_1} - f_{d_2} - f_{d_3})}{2 \cos \theta} = [V_x V_y V_z] \, [M]_{\mathrm{I}} \begin{bmatrix} 1 \\ 0 \\ 0 \end{bmatrix} = D_x$$

$(b) - (c)$ $$\frac{K(f_{d_2} - f_{d_3})}{2 \cos \theta} = [V_x V_y V_z] \, [M]_{\mathrm{I}} \begin{bmatrix} 0 \\ 1 \\ 0 \end{bmatrix} = D_y$$

$(b) + (c)$ $$\frac{K(f_{d_2} + f_{d_3})}{-2 \sin \theta} = [V_x V_y V_z] \, [M]_{\mathrm{I}} \begin{bmatrix} 0 \\ 0 \\ 1 \end{bmatrix} = D_z$$

Similar matrix manipulations yield the values for $D_x$, $D_y$, $D_z$ indicated in the table of FIG. 4A for the designated beam configurations illustrated in FIG. 3.

Performing the indicated matrix operations to solve for $D_x$, $D_y$, $D_z$, $$D_x = [V_x V_y V_z] \begin{bmatrix} \cos P \\ 0 \\ -\sin P \end{bmatrix} = \cos P \cdot V_x - \sin P \cdot V_z$$

$$D_y = [V_x V_y V_z] \begin{bmatrix} -\sin R \cdot \sin P \\ \cos R \\ -\sin R \cdot \cos P \end{bmatrix} = \sin P \cdot \sin R \cdot V_x + \cos R \cdot V_y - \cos P \cdot \sin R \cdot V_z$$

$$D_z = [V_x V_y V_z] \begin{bmatrix} \cos R \cdot \sin P \\ \sin R \\ \cos R \cdot \cos P \end{bmatrix} = \sin P \cdot \cos R \cdot V_x + \sin R \cdot V_y + \cos P \cdot \cos R \cdot V_z$$

Since there are three independent equations, solutions for $V_x$, $V_y$ and $V_z$ in terms of $D_x$, $D_y$, $D_z$, R and P may be determined. These solutions are tabulated in FIG. 5A. The equations of FIG. 5B express $V_x$ and $V_z$ as functions of $V_y$ instead of $D_y$ and those of FIG. 5C express $V_x$ as a function only of $D_x$ and $V_z$. The form of FIG. 5A is preferred because of the greater ease with which apparatus for performing the computations may be instrumented since only products and sums need be formed.

Before discussing a preferred embodiment of the invention, it is appropriate to examine the significance of the results obtained by the above analysis. When computations are made in accordance with the above derived equations, the Doppler frequency shifts from a plurality of radiated beams bearing a fixed relation to a pitching, rolling platform in space may be utilized to determine the magnitude and direction of the velocity of the platform in the space coordinates. It is unnecessary to install costly, heavy stabilization systems for maintaining the radiating system level with respect to the earth. Accordingly, the compact, efficient, lightweight lens system described herein may be employed in connection with the associated system to provide the lightweight accurate system essential for use in a helicopter and highly desirable in other aircraft.

The equations listed in FIG. 5A indicates the relation of the generalized Doppler variables to the three translational velocities. With the platform level, R and P are zero, sin R, sin P, and tan R are 0 while cos R, cos P, and sec P are unity. Then $V_y$ is seen to coincide with $D_y$, the cross-heading velocity of the moving platform, $D_z$ coincides with $V_z$, the vertical velocity of the aircraft, and $D_x$ coincides with $V_x$, the along heading velocity of the aircraft. A computer supplied with signals proportional to $D_x$, $D_y$, $D_z$ may then determine the velocity components of the aircraft. By integrating the velocity over the time traveled and utilizing the coordinates of a known starting point or other fixed point, together with heading information, the computer output may continuously supply an accurate indication of the present position of the aircraft. By inserting the distance and direction of a destination point to the starting point, the computer may be adapted to continuously indicate the distance to the destination, the distance from the origin and the deviation of the aircraft from the selected course line.

The foregoing analysis facilitates an understanding of the functions which are achieved by the apparatus in the block diagram of FIG. 6, which is an exemplary embodiment of a system for providing the above navigational information by radiating three beams through a microwave lens and processing the reflected energy from each beam. The detailed explanation of the mode of operation will be better understood after the following description of the physical arrangement of the system.

With reference to FIG. 6, a microwave lens 13 is energized by radiated energy from conical horns 14, 15, and 16, the latter horns being coupled to microwave converter 17 and microwave transmitter 18 by the directional couplers and power dividers 21. Transmitter 18 generates a transmitted signal of frequency $f_0$ and local oscillator signal of frequency $f_{LO}$ during alternate mutually exclusive intervals in response to gating pulses from gate generator 22, the frequency of this signal being controlled by altimeter 23. Converters 17, energized by the local oscillator signal, provide output signals for application to I-F strips 24 which are also energized by a pair of fixed frequency signals to provide an output signal to carrier elimination filters 25 displaced in the frequency spectrum from the input signal, but retaining the Doppler frequency shifts. The latter filters are also energized by fixed frequency signals that are utilized as carrier signals upon which the Doppler frequency shifted signals are modulated. One output from filters 25 is applied to a frequency doubler 26 whose output is applied to a mixer 27. The other two output signals from filters 25 are applied to mixer 28 to provide sum and difference frequency signals, the sum signal being applied to mixers 27 and 31 while the difference frequency signal is directly applied to one channel of the trackers 32. The other input to mixer 31 is a fixed frequency signal to effect an output from the latter mixer which includes the desired Doppler frequency shifted signals disposed about a carrier signal, enabling the trackers to respond to the Doppler frequency shifts. The mixer 31 output signal is applied as a second signal input to trackers 32. The third signal for application to the trackers is derived from the output of mixer 27.

The output of the trackers include signals whose frequency shifts are proportional to the three generalized Doppler variables $D_x$, $D_y$, $D_z$, together with a polarity indication for each variable to indicate the sense of the associated Doppler shift. The signals are applied to the base line computer 33 which also receives signals from shaft-to-digital converters 34, indicative of pitch angle, roll angle, and the sine and cosine of the aircraft azimuthal heading angle. The shaft-to-digital converters 34 couple to the computer in digital form, the analog information derived from roll and pitch reference 35 and heading reference 36. The output of base line computer 33 energizes an along course counter 37, which indicates the distance traveled along the course from the starting point or other reference point, a cross course counter 41 which indicates the magnitude and direction of deviation across the selected course line, and vertical and horizontal velocity indicators 42 and 43 respectively which indicate magnitude and direction of aircraft velocity in elevation and azimuth respectively.

Having discussed the system arrangement, its mode of operation will be described. When gate generator 22 renders microwave transmitter 18 operative for the generation of a microwave signal of frequency $f_0$, the latter signal is coupled through power dividers and directional couplers 21 to each conical horn 14, 15 and 16 which respectively radiate beams 1, 2 and 3 of FIG. 1 through lens 13.

Energy of the three beams returned from the ground is focused by the lens upon the respective horns from which the energy emanated. The directional couplers 21 direct the reflected energy, which includes the transmitted frequency $f_0$ plus the Doppler frequency shifts $f_{d_1}$, $f_{d_2}$, $f_{d_3}$ from the beams identified by corresponding numerals in FIG. 1, to microwave converter 17. In microwave converter 17, the three received signals are mixed with a local oscillator signal to provide the signals with the Doppler frequency shifts, transposed in frequency about a 42 mc. I-F frequency as indicated, for amplification by respective channels in I-F strips 42. Fixed frequency signals of 51 mc. and 9.5 mc. are also applied to the latter strips and the difference frequency signal is mixed with the 42 mc. signal to provide outputs which include the Doppler frequency shifts about 500 kc. and at low altitudes a 500 kc. carrier signal.

The characteristics of the pulsed Doppler radar system preferably utilized are described in detail below. At this point, it is to be noted that such a system is normally arranged so that the receiver is off when the transmitter is on. Thus, the 500 kc. carrier signal is usually not present. The exception occurs at very low altitudes when the pulse repetition frequency is at its highest value. Since energy from transmitted pulses returns almost instantaneously, the receiver is deliberately rendered operational during a portion of the interval in which a pulse is transmitted. During this interval, 500 kc. carrier signal is present in the I-F strips output signal. However, the proximity of the aircraft to the ground results in a signal return sufficiently strong to overcome the effects of carrier leakage after selective filtering by carrier elimination filters 42.

The signals from I-F strips 24 are applied to the carrier elimination filters 25 which remove the undesired carrier signal. Each filter is preferably of the type described in the co-pending application of M. A. Meyer, entitled Selective Circuit, Serial No. 329,803, filed January 6, 1953, now U.S. Patent No. 2,909,656, and are as illustrated in FIG. 1 thereof with respect to filters having $f_{d_1}$ and $f_{d_2}$ in the outputs. However, since it is desired that the signal output having the $f_{d_3}$ Doppler component be relatively close to 200 kc., the single side band modulator 25 in FIG. 1 of the aforesaid application is energized by quadrature components of a 200 kc. fixed frequency signal instead of the reference signal quadrature components as indicated therein.

The signal component containing $f_{d_1}$ is applied to doubler 26 to provide an output signal having a frequency component of 1000 kc. $+ 2f_{d_1}$. The other two output signals from the carrier elimination filters, having components including $f_{d_2}$ and $f_{d_3}$ about 500 and 200 kc. respectively, are applied mixer 28 to provide a difference frequency signal of 300 kc. $+f_{d_2}-f_{d_3}$ which is applied to one input of the trackers 32. The sum signal from mixer 28, having 700 kc. $+f_{d_2}+f_{d_3}$ is applied to mixer 27, and the difference frequency output therefrom, $$300 \text{ kc.}+2f_{d_1}-f_{d_2}-f_{d_3}$$

applied to another input of the trackers 32. The sum signal from mixer 28 is also applied to mixer 31, which has a second input energized by a 400 kc. fixed frequency signal. The difference frequency signal therefrom is applied as the remaining input signal to the trackers 32.

While the embodiment of FIG. 6 illustrates tracking occurring after mixing, the signals having the Doppler frequency-shifted components, $f_{d_1}$, $f_{d_2}$ and $f_{d_3}$ may be tracked before mixing without departing from the inventive concepts. In fact, an additional advantage of tracking before mixing is that an improvement in signal-to-noise ratio is obtained. This occurs because a substantially noise-free signal is supplied from the trackers to the mixers, effecting a marked reduction in the noise introduced by the mixing process.

With reference to FIG. 4A and more particularly to the column related to a configuration of three beams spaced 90°, the reason for the particular arrangement of mixers and doublers described above will now be better understood. First, observe that all the input signals to the trackers 32 are about 300 kc. and within the frequency range over which the preferred embodiments of the trackers, discussed below, are designed to operate. Second, note the desirable characteristics of the tracker input signals. The signal from mixer 28 to trackers 32 includes the Doppler components $f_{d_2}-f_{d_3}$, which differs from the equivalent of $D_y$ in the table of FIG. 4A only by a constant $$\frac{k}{2 \cos \theta}$$

The output signal from mixer 31 includes the component of $f_{d_2}+f_{d_3}$, differing from $D_z$ by a constant $$\frac{-k}{2 \sin \theta}$$

and the output signal from mixer 27 includes the Doppler components $2f_{d_1}-f_{d_2}-f_{d_3}$, the latter differing from $D_x$ only by the constant $$\frac{k}{2 \cos \theta}$$

As indicated earlier, the Doppler return is in fact a frequency spectrum. Computing operations are facilitated if a single frequency may be derived from the Doppler frequency spectrum which accurately characterizes the relative velocity information contained in the reflected spectrum. It has been discovered that accurate tracking may be obtained if a single frequency is derived which divides the return frequency spectrum into equal energy spectrums about this selected frequency; i.e., if $A(f)$ is the amplitude of the power spectrum as a function of frequency, and $f_c$ is the selected frequency $$\int_0^{f_c} A(f)df = \int_{f_c}^{\infty} A(f)df$$

Frequency sensitive apparatus which has this property is fully described in the co-pending application of M. A. Meyer, entitled Frequency and Phase Sensitive Apparatus, Serial No. 464,697, filed October 26, 1954. Thus, the preferred form of trackers 32 includes frequency sensitive apparatus for each input signal of the type illustrated in FIG. 3 of the aforesaid co-pending application with the input signal being applied to terminal 44 of bridge driver 45 illustrated in the latter figure. Oscillator integrator 24 therein then effectively tracks the input frequency spectrum and provides a single frequency output signal having the character described above which is applied to the discriminator 49 in the last mentioned FIG. 3. The latter discriminator is preferably of the type described in the co-pending application of Bernard M. Gordon, entitled Digital Discriminator, Serial No. 319,571, filed November 8, 1952, now U.S. Patent No. 2,858,425.

In FIG. 1 of the last mentioned application, the reference source frequency is 300 kc. and the output of the oscillator integrator is applied to input terminal 12. An output signal is provided in pulse form wherein the pulse output frequency is the Doppler shifted frequency combinations indicated in the input signals to the trackers. The apparatus illustrated in the FIG. 1 of the latter co-pending application provides at terminal 24 an indication of the sense of the frequency shift upon the polarity output lines of the trackers 32 associated with the respective Doppler variables.

While the helicopter of FIG. 1 is shown with beam 1 forward and beams 2 and 3 oriented to the side, the system is operable with beams 2 and 3 oriented fore and aft respectively and beam 1 to the side. The expressions of FIG. 3A which define the Doppler variables $D_x$ and $D_y$ would then be reversed. This arrangement is especially advantageous in that the variable $D_x$ along the heading direction of the helicopter is proportional to the algebraic sum of the Doppler shift received from the forward beam 2 and the negative of the Doppler shift received from the rearward beam 3. Since the shifts from the respective beams are normally sensed, that is to say, an increase in frequency of the signal received from the forward beam occurs concurrently with a decrease in frequency of the signal received from the rearward beam, the combined shift is substantially twice that received from either beam alone, thereby enhancing system sensitivity.

From the above discussion, it is seen that the constants $C_y$ and $C_x$ appearing on the output lines from trackers 32 are $$\frac{2 \cos \theta}{k}$$

while the constant $C_z$ is $$\frac{-2 \sin \theta}{k}$$

The indicated signals are fed into base line computer 33 for appropriate combination with the constants to provide signals representative of the Doppler variables $D_x$, $D_y$, and $D_z$, which are then combined with the indicated signals from shaft-to-digital converters 34 in accordance with any of the sets of equations in FIG. 5, but preferably the set tabulated in FIG. 5A.

Those skilled in the art may instrument the computer in many different ways utilizing known analog or digital techniques. However, since the output of the trackers 32 are pulse trains, the indicated multiplicative operations are preferably performed by the binary rate multipliers disclosed in the co-pending application of Maurice A. Meyer and Bernard M. Gordon, entitled Pulse Rate Multiplier, Serial No. 324,312, filed December 5, 1952, now U.S. Patent No. 2,910,237, and the application of Bernard M. Gordon, entitled Synchronized Rate Multiplier Apparatus, Serial No. 355,325, filed May 15, 1953, now U.S. Patent No. 2,913,179. A discussion of the preferred techniques for instrumenting the computing system 33 appears in an article by M. A. Meyer, entitled "Digital Techniques in Analog Systems," which appears on page 23 of the June 1954 "Transactions of the I.R.E. of the Professional Group on Electronic Computers." The preferred means for deriving the quotients indicated in the tabulation of equations in FIGS. 5B and 5C is described in a paper by M. A. Meyer, B. M. Gordon, and R. W. Nicola, entitled "An Operational-Digital Feedback Divider," which appears on page 17 in the March 1954 "Transactions of the I.R.E. of the Professional Group on Electronic Computers." One example of computing system 33 which responds to the indicated inputs is described in a paper presented at the Pittsburgh meeting of the Association for Computing Machinery, at the Mellon Institute, May 2 and 3, 1952, by Bernard M. Gordon and Renato N. Nicola, entitled "Special Purpose Digital Data Processing Computers."

The heading reference may be derived from a gyro compass and the roll and pitch reference from a suitable gyro. The shaft position of the roll, pitch and heading indicators is converted into digital indications by shaft-to-digital converters 34 which may be of the type described in the co-pending application of Adolph W. Awot, Bernard M. Gordon, and Maurice A. Meyer, entitled Analog-to-Digital Converter, Serial No. 350,994, filed April 24, 1953, now U.S. Patent No. 2,866,183.

The output of the computer 33 is a pulse for every predetermined unit of length travelled along the selected course line which is applied to along course counter 37. A similar indication for distance travelled across the course is applied to cross course counter 41. The latter counters are preferably of the type which are mechanical and reversible and display a numerical visual indication of the distance travelled along and across the course.

The velocity indicators 42 and 43 are preferably bipolar meters with a zero indication manifested by the pointer being centered. Zero vertical velocity is indicated by the horizontal position of the pointer while upward and downward velocity is indicated respectively by upward and downward pointer deflection, the amount of deflection being related to the magnitude of the velocity.

The horizontal velocity indication is divided preferably into two indications which appear on one meter face. Left-right velocity is indicated by a vertically suspended pointer which is centered when the left-right velocity is zero and moves in the direction of the drift velocity, the magnitude of the latter being proportional to the pointer deflection. Forward-backward velocity is indicated by a horizontal pointer which is centered at zero along-course velocity and moves upward to indicate forward motion and downward to indicate rearward motion, the magnitude of deflection being proportional to the magnitude of the velocity.

Having described the navigational system, certain system elements and subcombinations will be described. With reference to FIG. 7, there is illustrated a horn-lens arrangement for effecting the beam pattern illustrated in FIG. 3A. The radiator is seen to comprise microwave lens 13 secured to the frame 51 by the ring 52. At the opposite end of the frame is another circular ring 53 substanially parallel to ring 52. Cross supports 54 and 55 support horns 56, 57, 58 and 59 which are oriented so that their respective axes intersect at the center of lens 13. The lens antenna system has the property that the focal points of the lens are disposed about the lens axis upon a circle which passes through the apparent point source of energy of the horns whereby rays of energy emanating from the latter are focused into collimated beams which are radiated at an angle to the lens axis. The angular position of the beam about the axis is dependent upon the angular position about the axis of the apparent point source of the horn from which the rays emanate. Energy received along the line of direction of the radiated beam is focused at the focal point where the horn apparent point source is located. For the conical horns utilized in the preferred embodiment, the apparent point source is located in the mouth of the horn near the apex.

The method of designing such a lens is described in a paper by Robert L. Sternberg, entitled "Successive Approximation and Expansion Methods in the Numerical Design of Microwave Dielectric Lenses" on page 209 of the "Journal of Mathematics and Physics" for January, 1956. With the horn mouths disposed substantially along the circle of focus as illustrated, four beams are radiated which make the same angle with the normally vertical lens axis disposed at 90 degree intervals about the axis. Removing one horn results in the radiation of the beam pattern illustrated in FIG. 3C, and positioning three of the horns at 120 degree intervals about ring 53 results in radiation of the beam pattern of FIG. 3B. Reflected energy from each beam is focused by the lens back to the horn from which it emanated.

With reference to FIG. 8, another horn-lens arrangement is illustrated which effects a marked reduction in the volume occupied by the horn-lens combination. Like the structure of FIG. 8 the microwave lens 13 is secured to frame 51 by means of ring 52. However, at the opposite end of the frame 51 is a reflecting surface 62 and the horns 56, 57 and 58 are supported by an outer ring 61 in a manner whereby each horn axis intersects the reflecting surface 62 at an angle equal to that made by a line drawn from the point of intersection to the lens center. Thus, energy transfer between the horns and the lens occurs via reflection from reflecting surface 62. Accordingly, the length of the frame 51 along the system axis for a given lens focal length may be substantially one-half that required for the system illustrated in FIG. 7.

Figure 9:
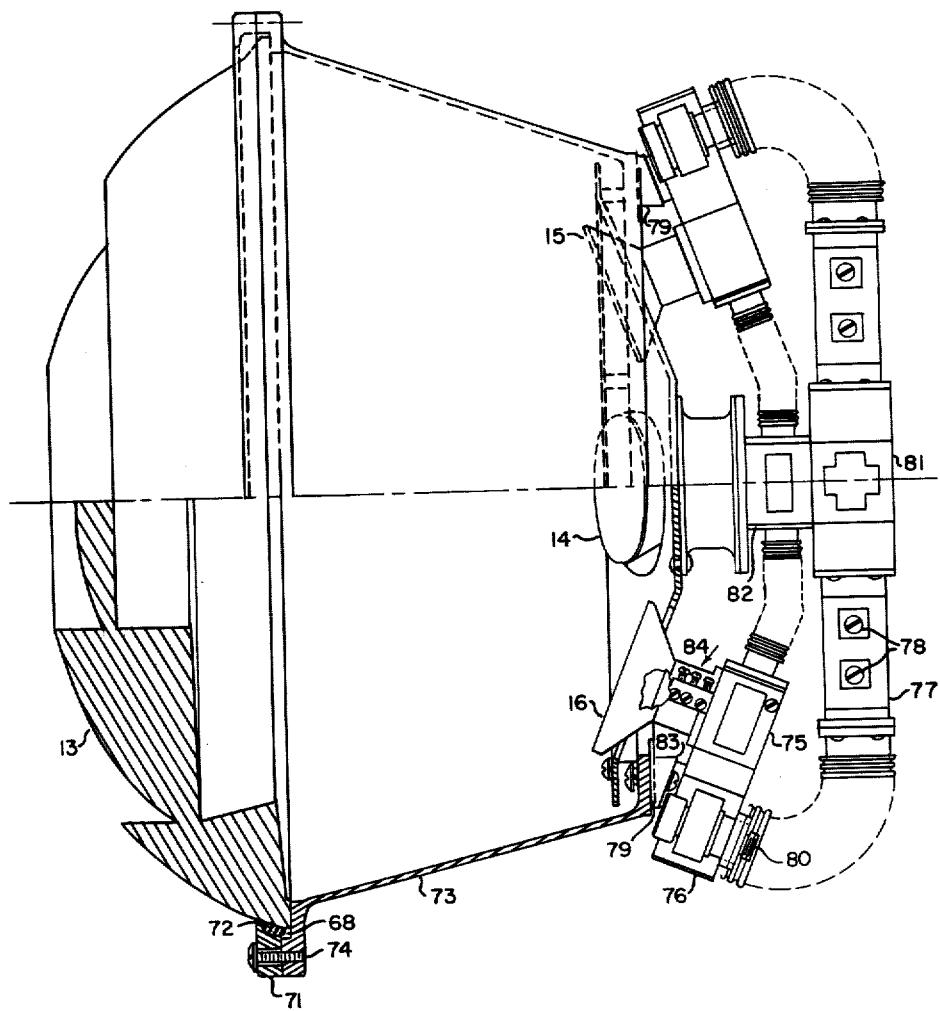
FIG. 9 is a cross sectional view of a preferred form of a three beam radiating system utilizing a zoned microwave dielectric lens energized by three circular horns.

With reference now to FIG. 9, there is illustrated a plan view of a preferred form of the three-beam radiating system in which reference numerals appearing in prior figures and designating corresponding elements are retained in FIG. 9. The preferred structure includes the zoned microwave dielectric lens 13, illustrated partially in section, supported within a retaining ring 71 and cushioned by a flexible ring 72, which enables the lens to expand and contract within the air space 68 in response to temperature changes while still maintaining the exact centering of the lens with respect to the horns. Ring 71 is secured to the lens and horn support 73 by a plurality of screws 74, only one of the screws being shown in FIG. 9.

Since the horns and associated components are substantially the same, the discussion which follows will relate almost exclusively to horn 16 and associated components, it being understood that the arrangement of the other horn systems is essentially the same. Spacer block 79 is slidable along the inclined plane of block 79 to facilitate accurate positioning of the apparent point source of each horn to be substantially coincident with a desired lens focal point. Another spacer block 79 is visible near horn 15. Horn 16 is connected to coupler 75 which is a turnstile junction feeding a magic T, the former serving both as a circular polarizer and passive transmitter-receiver duplexer and the latter as a mixer. Crystal holders 76, only one of which is visible in FIG. 9, contains the mixing crystals, and in conjunction with the receiver-magic T portion of coupler 75, serve as the receiver-mixer for one channel of the system. The local oscillator signal is waveguide coupled to the receiver-mixer through filter 77 tuned by screws 78 to pass the local oscillator signal while rejecting received signals near transmitted frequency. Turnstile junction 81 is energized with local oscillator signal derived from microwave transmitter 18 (FIG. 6) and functions as a power divider to channel local oscillator signal to the crystal holders 76 associated with each horn. Turnstile junctions 82 function as a transmitter 18 to the duplexer-polarizer turnstiles 75 associated with each horn.

Having described the arrangement of the lens feed system, the power flow therethrough will be discussed. During time intervals selected for radiation, a microwave signal of transmitted frequency $f_0$ is applied to turnstile junction 82 from transmitter 18 (FIG. 6). The turnstile junction of coupler 75 is arranged both as a duplexer and circular polarizer which directs the energy from turnstile junction 82 for radiation by horn 16. Tuning screws 84 are a fine adjustment of the duplexing characteristic of the associated turnstile junction, reducing reception of unwanted signals, such as spurious reflections from the lens, and side lobe radiation from adjacent horns.

Scattered energy from the ground due to radiation from horn 16 is focused by lens 13 back to horn 16 and directed by the turnstile junction portion to the magic T portion of coupler 75. Mixing occurs in the crystal in holders 76 which are also energized by local oscillator signal coupled through filter 77 and turnstile junction 81 from transmitter 18 and the I-F signal appears at the output coaxial connector 80 of holder 76 for application to I-F amplifier 24 (FIG. 6). The crystals in the two holders 76 associated with a horn are oppositely poled and the two coaxial outputs are connected in parallel.

Filters 77 selectively admit only local oscillator signal to the associated mixers while rejecting signals of other frequencies present in the system. The filters 77 are especially useful in preventing the received signal from one horn being coupled through the local oscillator signal waveguide to the mixer associated with another horn. If this were allowed to occur, the signal supplied to respective I-F channels would include undesired signals not related to the associated beam, leading to erroneous velocity indications. The presence of the filters is especially important when the helicopter is making a steep bank such that one of the beams is pointed directly downward resulting in a much stronger return therefrom than from one or more of the others which make a slight angle with the horizontal. Without the filters, the leakage signal coupled from the vertically directed beam to the mixer associated with the nearly horizontal beam would be of the same order of magnitude as the received reflected beam and introduce serious inaccuracies. With the filter arrangement illustrated, such leakage signals must pass through two filters to reach a mixer; hence, leakage problems of this type are eliminated.

Although the turnstile junction is well known in the art, its utilization in this apparatus is novel and results in a number of advantages. These advantages and uses are described in a paper by Maurice A. Meyer and Harold B. Goldberg, entitled "Applications of the Turnstile Junction," which appears in the "IRE Transactions on Microwave Theory and Techniques" for December 1955 on page 40.

Although the aforesaid article describes the utilization of the turnstile junction for three way power division, the novel method employed is described below to facilitate understanding power division in the preferred embodiment where three beams are radiated.

As is well-known in the art, a turnstile junction comprises four co-planar orthogonally intersecting rectangular wave guides whose axes intersect the axis of a circular wave guide at a common point, the latter axis being perpendicular to the plane of the former axes. In the turnstile junction a matching section is symmetrically placed about the axis of the circular section.

Three way power division results when one of the rectangular guides is the input guide and energized with power to be divided. Outputs are taken from the remaining three rectangular guides. A reflecting plate covers the circular waveguide, and a tuning screw or iris is positioned and adjusted in the input guide until the standing wave ratio in the input guide becomes substantially unity, indicating that no power is reflected back to the source.

The property of the turnstile is such that initially power divides with one-fourth delivered to each of the rectangular guides adjacent to the input guide, and the remaining one-half delivered to the circular guide section. But with the reflecting plate across the latter section, this one-half is reflected back into the junction and equally divided between the input guide and the remaining output guide. At this stage one-fourth of the input power has been delivered to each of the output guides, and one-fourth to the input guide, but since the matching screw or iris precludes transmission to the source, it follows that this one-fourth is reflected back into the junction from the iris or tuning screw. This one-fourth again divides in the same manner, one-sixteenth to each of the output guides, and one-sixteenth to the input guides where multiple reflections continue until the power is equally distributed to the three output guides.

Figure 10:
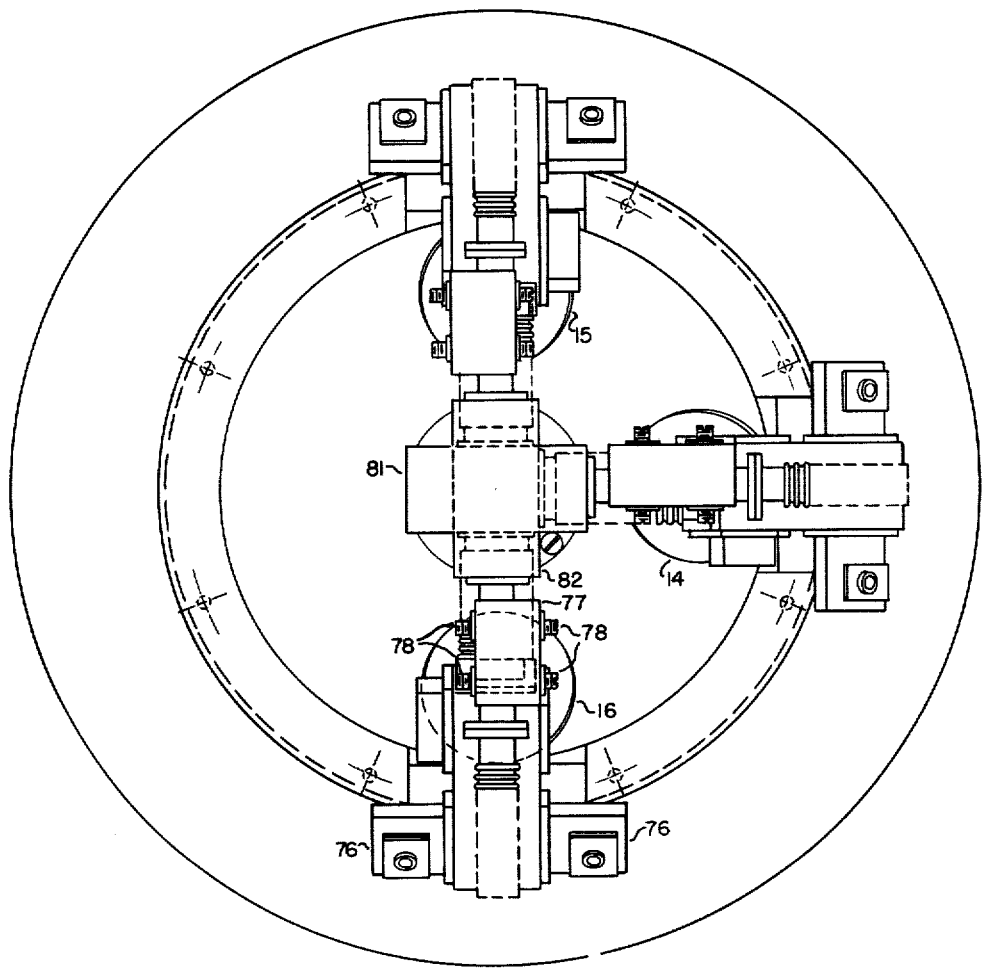
FIG. 10 is a view of FIG. 9 along the lens axis.

Referring to FIG. 10, there is illustrated a view along the lens axis of the apparatus of FIG. 9 with the reference numerals of FIG. 9 designating the same elements in FIG. 10. The foregoing detailed discussion of FIG. 9 is applicable to FIG. 10. Both crystal holders 76 associated with horn 16 are visible in FIG. 10.

Figure 11:
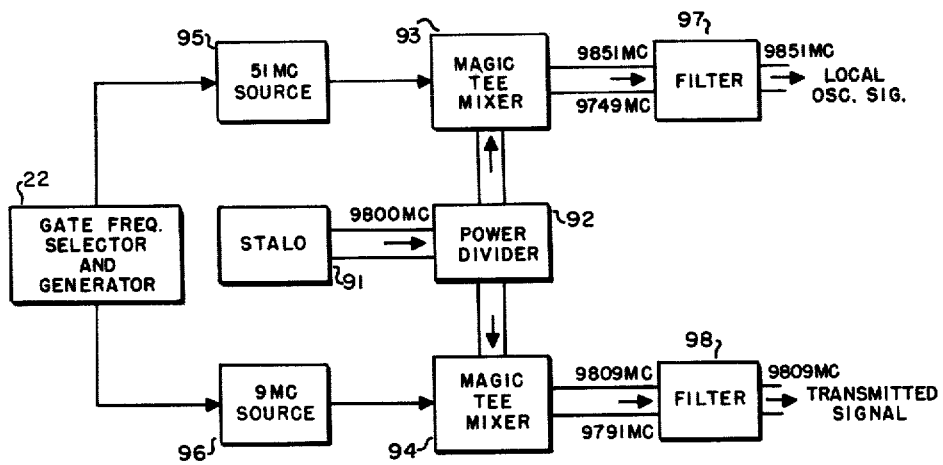
FIG. 11 is a block diagram of a preferred embodiment for generating transmitted and local oscillator microwave signals.

With reference to FIG. 11, a preferred form of microwave transmitter 18 of FIG. 6 is depicted in block diagram form. While conventional microwave signal sources may be used to generate the radiated and local oscillator signals, the preferred embodiment of microwave transmitter 18 has features which are especially advantageous in connection with Doppler navigational systems. These advantages will be better understood after the discussion of the ararngement of the transmitter and its mode of operation. Microwave transmitter 18 is seen to comprise a stable local oscillator 91 which energizes magic tee mixers 93 and 94 through a power divider 92. Mixers 93 and 94 are also energized by 51 mc. and 9 mc. sources 95 and 96 respectively. The latter signal sources emit signals during alternating mutually exclusive time intervals in accordance with a gating signal from gate frequency selector and generator 22. The outputs of mixers 93 and 94 are applied to filters 97 and 98 respectively, the output signals from the latter filters being applied to microwave converter 17 and directional couplers and power dividers 21 respectively (turnstile junctions 81 and 82 in FIGS. 9 and 10). Stalo 91 is a stable microwave oscillator preferably of the type wherein a servo control system, which includes a discriminator cavity, maintains the oscillator frequency at substantially the center frequency of the cavity. Other stable oscillators, such as the type employing a relatively low frequency crystal oscillator energizing a chain of frequency multipliers may also serve as the stable local oscillator.

In this example, the output signal from the stable local oscillator is a 9800 mc. microwave signal and is applied through microwave coupling means to power divider 92 which channels portions of the input power through microwave coupling means to magic tee mixers 93 and 94. Although other mixing means may be employed, each mixer is preferably of the type employing semiconductor diodes in a magic tee arrangement which precludes energy from being coupled back to power divider 92. When source 95 responds to the gating signal from gate generator 22 with a 51 mc. output signal, mixer 93 is also energized by the latter to provide an output signal which includes sum and difference frequency signals of 9851 mc. and 9749 mc. respectively. A filter 97 rejects all but the 9851 mc. signal and the latter serves as the local oscillator signal for application to power divider 81 in FIG. 9. When the signal from gate generator 22 maintains source 95 in the inactive state, the only output from mixer 93 is a 9800 mc. signal which is rejected by filter 97; hence, there is no local oscillator signal and microwave converter 17 (FIG. 1) is effectively inoperative. Accordingly, receiving apparatus, which includes converters 17 and I.-F. strips 24, is then insensitive to received signals. To more completely desensitize the receiving apparatus during the transmitting interval, the 51 mc. source 95 is coupled to terminal 18 of the I.-F. strips 24 in FIG. 6, there normally being no 51 mc. signal then applied to terminal 18 during the interval a pulse is transmitted. A further result is a reduction of noise to signal ratio of substantially 3 db because thermal noise at the input circuits of the I.-F. strips is eliminated during these intervals.

When the signal from gate generator 22 activates source 96, mixer 94 is also energized by a 9 mc. signal to provide a signal output which includes sum and difference frequency signals of 9809 mc. and 9791 mc. respectively. Filter 98 rejects substantially all but the 9809 mc. signal to provide a transmitted signal of 9809 mc. at the output which is applied to power divider 82 in FIG. 9. When the gating signal from generator 22 disables signal source 96, the only output signal from mixer 94 is a 9800 signal which is rejected by filter 98. No signal is transmitted during this interval.

It is seen that this novel arrangement provides the desired alternate operation of transmitter and receiver at microwave frequencies by controlling the emission of relatively low frequency signals. Stalo 91 continues to emit at all times; hence, no stability problems are presented with respect to the primary microwave signal frequency which is relatively easy to gate the 51 mc. and 9 mc. sources without affecting the frequency stability of their output signal. Thus, two stable microwave signals are supplied whose frequency difference is the desired high frequency of the receiver I.-F. strips. Since both signals are derived from stalo 91 any drift in the output frequency of the latter causes no change in the difference frequency signal. The stability of the latter is dependent only on the stability of the 9 and 51 mc. signal sources, which frequencies may be controlled within tight tolerances by utilizing well-known crystal oscillator techniques.

As indicated above, the preferred system includes a time-shared transmitter-receiver; that is, when the transmitter is on the receiver is off and vice versa. This type of operation effects increased system sensitivity. With C. W. Doppler systems the return signal must be high enough to override carrier leakage signals from the transmitter, but with the system described herein the receiver is operative during intervals when no carrier signal is radiated; hence, substantially all the gain of the receiver may be utilized for responding to the reflected signal. The particular embodiment preferred for effecting this duplexer type of arrangement utilizes a stable microwave signal source which continually generates a primary microwave signal whose frequency is different from that of the transmitted signal, thus enabling the latter source to remain on at all times, the receiver being insensitive to its output frequency, even though portions might leak to the receiver.

A feature of the present system is the utilization of a 50% duty cycle; that is, the duration of each radiated pulse is substantially equal to the time interval between pulses. Accordingly, reflected energy is returned to the receiver for a longer period of time as compared with prior art low duty cycle pulsed radar systems where the interval between radiated pulses greatly exceeds the pulse duration. Furthermore, by controlling the pulse repetition rate in accordance with the aircraft altitude so that as the transmitted pulse ends, the reflected energy from the leading edge thereof returns to the aircraft, the receiver may operate at maximum sensitivity while responding to substantially the entire reflected pulse.

Another feature of the present invention is the utilization of coherent fixed frequency signals. The signals of frequency 200 kc., 500 kc., 700 kc., 9 mc., 9.5 mc. and 51 mc. are all generated from the same basic timing oscillator source by utilizing a combination of harmonic generators and mixers of the type well known in the art. Since both the local oscillator and transmitted signals are derived by combining the same stable microwave signal with one of the coherently generated signals, the transmitted signal and all signals in the receiving system are coherent; hence, despite the frequency translation of the returned Doppler frequency-shifted spectra within the receiving system, precise retention of the Doppler frequency shifts relative to an appropriate reference frequency is readily obtained.

This advantage is more readily appreciated when the prior art non-coherent two-beam pulsed systems are considered. These systems utilized depressed beams oriented forward and rearward, a pulsed magnetron generating the microwave energy for radiation. Because no coherent local oscillator signal was there available, it was necessary to determine the Doppler frequency shift by mixing the signal returns from the forward and rearward beams to derive a signal with audio frequency components. If the forward beam were radiating upon a hill while the rearward beam were radiating into a valley, the signal return from the former would arrive before that from the latter. If the beams were pencil beams, then there would not be an interval in which simultaneous returns from both beams were available and no Doppler frequency shift would be detected for the previously radiated pulse. To avoid this difficulty, the prior art systems radiated beams having a wide dimension substantially along a hyperbola of constant Doppler frequency shift. Thus, energy returns from the earth during a time interval much greater than the duration of a transmitted pulse. This arrangement dictates a requirement for an increase in the radiated power to attain a given system sensitivity.

The coherent arrangement of the present invention enables frequency shifts present in the signal return from each beam to be independently detected. As a result, pencil beams may be radiated to effect an increase in system sensitivity for a given radiated power. This system also permits the Doppler frequency-shifted spectrum to be tracked at relatively high frequencies. Advantages of high-frequency tracking are discussed below.

Another advantage of the 50% duty cycle of the present invention is the nature of the frequency spectrum thereby radiated. Most of the energy is in sidebands relatively close to the carrier frequency. Accordingly, even the prior art systems which track at relatively low frequencies, would be supplied with more low frequency energy in the signal return if a high duty cycle were employed, thereby increasing system sensitivity. The relatively narrow radiated pulses of the prior art systems have a spectral distribution wherein a substantial portion of the radiated energy is in the higher order sidebands, which is all discarded by the low pass filter arrangement used to eliminate the ambiguity problem discussed below in connection with spectrum fold-over.

Figure 12:
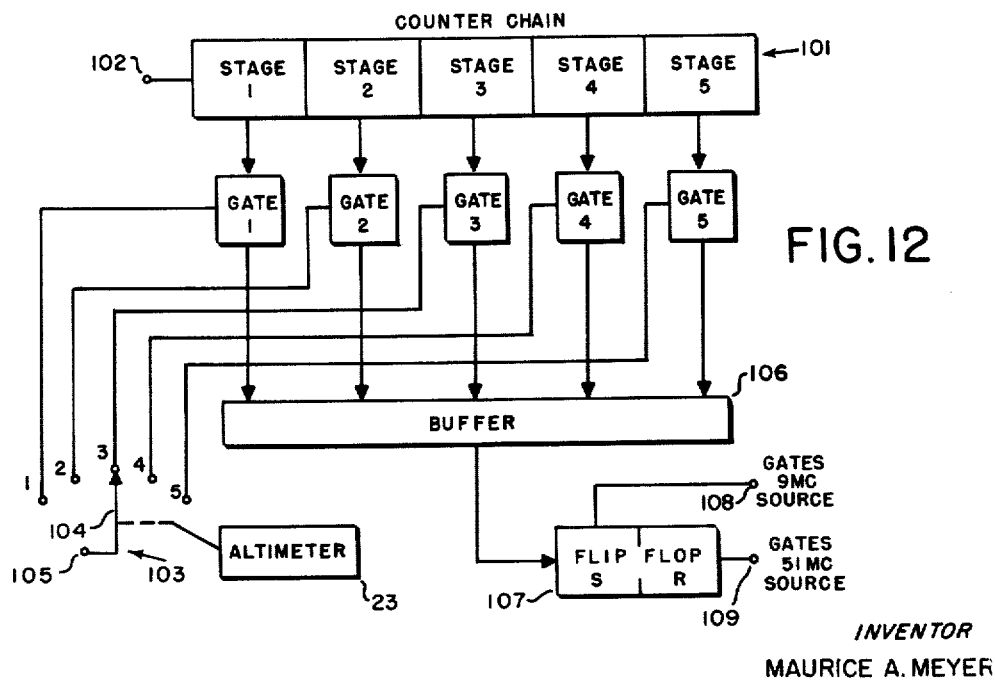
FIG. 12 illustrates a block diagram of apparatus for generating an altitude-controlled gating signal.

Operation of the aforesaid system will be better understood from the following discussion of the system block diagram in FIG. 12, and the signal waveforms graphically represented as functions of time in FIG. 13. With reference to FIG. 12, there is illustrated in block diagram form, gate frequency selector and generator 22 of FIGS. 6 and 11 arranged to cooperate with altimeter 23 of FIG. 6. A counter chain 101 is energized on terminal 102 by the 500 kc. signal utilized elsewhere in the system illustrated in FIG. 6. The output of each counter stage is coupled to a gate whose other input is connected to a terminal on switch 103, each terminal and gate bearing a number which corresponds to the associated counter stage. The arm of switch 104 is coupled to a source of positive potential at terminal 105 and actuated by the shaft of altimeter 23. The outputs of the gates are coupled to buffer 106 which in turn energizes flip-flop 107. The S output of flip-flop 107 at terminal 108 is coupled to the 51 megacycle source 95 in FIG. 11, while the R output thereof on terminal 109 is coupled to the 9 megacycle source 96.

Referring to the signal waveforms of FIG. 13, the mode of operation of the system of FIG. 12 will be described. Counter stage 101 is energized at stage 1 by the 500 kc. signal utilized elsewhere in the system. Stage 1 responds to this input signal with a plate signal waveform illustrated in FIG. 13A. The remaining stages respond to the signals from the preceding stage to provide plate signal waveforms illustrated in FIGS. 13B, 13C, 13D and 13E. Each of these plate waveforms is differentiated and applied to an associated gate. The arm of switch 104 is actuated by movement of the shaft of altimeter 23, the system being arranged so that arm 104 connects terminal 105 to switch position 1 when the altimeter indicates 0–2000 feet, to switch terminal 2 when 2000–4000 feet is indicated, to switch terminal 3 when 4000–8000 feet is indicated, to switch terminal 4 when 8000–16000 feet is indicated, and to switch terminal 5 when readings above 16,000 feet are indicated. When a switch terminal is connected to terminal 105, a corresponding gate is activated and output pulses therefrom are coupled to buffer 106 which in turn couples pulses to flip-flop 107. For example, with arm 104 connected to switch terminal 3 as illustrated, the gate 3 output pulses illustrated in FIG. 13F are coupled through buffer 106 to flip-flop 107, the latter responding by providing as an output signal on terminals 108 and 109 the plate waveforms from the S and R sections respectively illustrated in FIGS. 13G and 13H. The latter two waveforms are of opposite phase and are respectively applied to the 9 mc. source 96 and the 51 mc. source 95 to control their respective outputs. In response to the two gating signals from flip-flop 107, the output signals from filters 98 and 97 of FIG. 11 are as illustrated in FIGS. 13J and 13K respectively. Thus, bursts of a signal for radiation and local oscillator signal are generated for equal durations, but during mutually exclusive alternating time intervals.

The reason for varying the pulse repetition rate in steps is to avoid unwanted modulation products in the received signal. As indicated in connection with the discussion of FIG. 6, the input signals to the carrier elimination filters 25 may include a 500 kc. component. Since the generated microwave signals are pulsed at a subharmonic of 500 kc., the received signal also contains a 500 kc. harmonic of the pulse repetition frequency. However, since the gating signal is derived from the same 500 kc. source which energizes the rest of the system, the harmonics at 500 kc. are in phase with other 500 kc. signals present and introduce no additional frequency-shifted components which might erroneously be detected as Doppler shifts. It has been discovered that utilization of the indicated technique of halving the pulse repetition rate when the indicated altitude is doubled results in adequate system sensitivity.

Although this gating system has been described in connection with a conventional electron tube flip-flop counter chain and a vacuum tube flip-flop 107, the novel concepts may be embodied utilizing transistor and/or magnetic core circuits which perform similar functions, and altimeter information may be supplied from any suitable altitude indicating device.

In prior art systems, in order to lessen the reduction in system sensitivity at altitudes where the transmitted pulse occurs simultaneously with the signal return from a previous transmitted pulse, it has been the practice to frequency modulate the pulse repetition frequency. However, this does not eliminate another difficulty inherent in the prior art systems. As indicated above, the beam width along the hyperbola of constant Doppler shift is a relatively wide angle. At higher altitudes the projection of this width along the earth is so large that energy from a radiated pulse returns for a time interval longer than the time interval between transmitted pulses. As a result, there is an overlapping of signal returns from consecutively transmitted pulses, thereby effecting a reduction in system sensitivity.

The pencil beams radiated by the present system and the 50 percent duty cycle of the radiated pulse train having an altimeter-controlled pulse repetition frequency enable maximum sensitivity to be obtained with the system of the present invention.

While the apparatus described above has many features, of special interest is the method of tracking the Doppler spectra to derive the signals characteristic of the generalized Doppler variables. This method of tracking at a relatively high frequency offers advantages not present in prior art apparatus where the Doppler shifted frequency spectrum is translated about zero frequency before tracking, and a pulsed radar transmitting system is employed. The reflected energy Doppler spectra are disposed about frequencies which are harmonics of the pulse repetition frequency and prior art systems utilize only the spectrum corresponding to the carrier. Thus, the remaining energy is discarded and system sensitivity for a given radiated power accordingly reduced.

By utilizing the tracking system described herein wherein the entire reflected power spectrum is average to select the desired frequency, all the reflected energy is utilized and the radiated power may accordingly be reduced for a given system sensitivity.

Prior art systems tracking at low frequencies also encounter difficulties when attempting to track Doppler-shifted frequency spectra characteristic of high velocities which aircraft, such as jet planes, are capable of attaining. This results from a phenomenon known in the art as "spectrum foldover" which occurs when a frequency spectrum about a high frequency is translated about zero frequency. The lower sidebands of the original spectrum fold over the relocated upper sidebands when translated about zero frequency. The phenomenon is objectionable in prior art systems when the Doppler frequency shift exceeds one-half the pulse repetition frequency.

The difficulty will be understood when it is recognized that a line spectrum is radiated with spectral components including the carrier frequency and frequencies separated therefrom by integral multiples of the pulse repetition frequency. Each reflected spectral component is received as a Doppler frequency-shifted spectrum bearing substantially the same Doppler shift. When this shift exceeds one half the pulse repetition frequency, the shifted spectrum returned from the carrier frequency is centered about a spectral line shifted from the latter by a frequency greater than half the pulse repetition frequency, while the reflected spectrum from the first lower sideband component is centered about a line less than one-half the pulse repetition frequency from the carrier freqeuncy. When the latter spectrum is folded over, it appears between zero frequency and the desired return spectrum from the carrier component. The low pass filter of prior art apparatus would then cut off the desired spectrum and track the folded over spectrum, thus yielding an erroneous indication of the velocity, for increases in velocity would move the folded over spectrum closer to zero frequency while the desired spectrum moved further away.

The example illustrated in FIG. 14 will clarify this phenomenon. In FIG. 14A, there is illustrated that portion of a radiated spectrum which includes the spectral components at carrier and first upper and lower side band frequencies, respectively 111, 112 and 113, $f_0$ representing the transmitted microwave frequency, and $f_{prf}$, the pulse repetition frequency. FIG. 14B illustrates the returned Doppler shifted spectra from the corresponding spectral lines of FIG. 14A when the Doppler frequency shift $f_d$ is less than $$\frac{f_{prf}}{2}$$

and the returned spectra are translated about zero frequency. FIG. 14C is like FIG. 14B except $f_d$ is greater than $$\frac{f_{prf}}{2}$$

In FIG. 14B, spectra 111B and 112B are the returned Doppler spectra from transmitted spectral lines 111 and 112 respectively relative to zero frequency after translation thereabout. If negative frequencies were physically attainable, the position of the reflected spectrum from line 113 would be as indicated by image spectrum 113B' at $-f_{prf} \pm f_d$. Since negative frequencies are not physically attainable, the latter spectrum is folded over the zero frequency axis as indicated to become spectrum 113B, the same distance from the zero axis as image spectrum 113B'.

In prior art trackers, the spectrum tracked is the one nearest zero frequency. In the case illustrated in FIG. 14B, spectrum 111B, the return spectrum from the carrier occupies this position and is properly tracked to yield the correct velocity indication.

Now consider the case illustrated in FIG. 14C where $f_d$ exceeds $$\frac{f_{prf}}{2}$$

Spectra 111C, 112C and 113C are the returned Doppler spectra from transmitted line spectra 111, 112 and 113 respectively after translation about zero frequency. Again the image spectrum 113C' of spectrum 113C lies the same distance from the zero axis as the latter. However, now spectrum 113C lies nearest the zero axis and is accordingly tracked to yield an erroneous velocity indication.

This error is understood when it is realized that for increased velocities, the Doppler shift increases and spectra 111C and 112C and image spectrum 113C' move to the right. But spectrum 113C moves to the left, and tracking the latter yields an erroneous indication of decreasing velocity.

The above limitation imposes a severe obstacle toward adapting prior art apparatus for use in jet aircraft where the high velocities encountered result in corresponding Doppler frequency shifts which exceed one-half the pulse repetition frequency. Since the apparatus of the present invention tracks at a relatively high frequency and responds to a plurality of the returned spectra, no such limitation is imposed.

In connection with the foregoing description of a preferred embodiment of the invention, specific frequencies and component arrangements have been described by way of example only. Those skilled in the art may make numerous modifications of and departures from the specific apparatus described herein without departing from the disclosed inventive concepts. Consequently, the invention is to be construed as limited only by the spirit and scope of the appended claims.

What is claimed is:

1. In a Doppler radar system apparatus comprising, a source of coherently generated high frequency transmitted and local oscillator signals, means for pulsing said transmitted signal to provide high frequency energy pulses separated by intervals substantially equal to the duration of said pulses, means for radiating a plurality of pencil beams of high frequency in response to and of the same frequency as said pulses, means for receiving the energy from each beam returned from a scattering surface, and means for mixing the returned energy from each beam with said local oscillator signal.

2. In a Doppler radar system supported by a vehicle, apparatus comprising, a source of coherently generated high frequency transmitted and local oscillator signals separated in frequency by an intermediate frequency, means for pulsing said transmitted signal to provide high frequency energy pulses separated by intervals substantially equal to the duration of said pulses, means for radiating a plurality of pencil beams of high frequency energy in response to and of the same frequency as said pulses, means for receiving the energy from each beam returned from a scattering surface, the Doppler shift of the returned energy frequency spectrum associated with each beam being characteristic of the vehicle velocity along the respective beam relative to said surface, and means for separately mixing the returned energy from each beam with said local oscillator signal to provide respective difference frequency signals with the respective returned energy frequency spectra transposed about said intermediate frequency.

3. In a Doppler radar system apparatus comprising, a source of coherently generated high frequency transmitted and local oscillator signals, means for radiating through a microwave lens a plurality of pencil beams of high frequency energy in response to and of the same frequency as said transmitted signal, means for receiving through said lens the energy from each beam returned from a scattering surface, and means for mixing the returned energy from each beam with said local oscillator signal.

4. In a Doppler radar system suported by a vehicle, apparatus comprising, a source of coherently generated high frequency transmitted and local oscillator signals separated in frequency by an intermediate frequency, means for radiating through a microwave lens a plurality of pencil beams of high frequency energy in response to and of the same frequency as said transmitted signal, means for receiving through said lens the energy from each beam returned from a scattering surface, the Doppler shift of the returned energy frequency spectrum associated with each beam being characteristic of the vehicle velocity along the respective beam relative to said surface, and means for separately mixing the returned energy from each beam with said local oscillator signal to provide respective difference frequency signals with the respective returned energy frequency spectra transposed about said intermediate frequency.

5. In a Doppler radar system supported by a vehicle, apparatus comprising, means for radiating through a microwave lens a plurality of high frequency pencil beams angularly disposed from and about the lens axis, means for receiving through said lens the energy from each radiated beam which is returned from an object, the Doppler shift of the returned energy frequency spectrum associated with each beam being characteristic of the vehicle velocity along the respective beam relative to said object, means for generating a local oscillator signal which is coherent with the high frequency energy in said pencil beams, and means for mixing the returned energy from each beam with said local oscillator signal to produce from said each beam a signal comprising its returned energy frequency spectra transposed about a frequency equal to the difference between said high frequency and the frequency of said local oscillator signal.

6. In a Doppler radar system supported by a movable vehicle, apparatus comprising, a microwave lens, means for radiating through said microwave lens at least three microwave beams angularly disposed from about the lens axis, and means for receiving through said lens energy from each radiated beam which is returned from an object, and means connected to the receiving means for deriving the Doppler shift of the returned energy frequency spectrum associated with each beam.

7. In a Doppler radar system supported by a vehicle which is to move with a desired heading, apparatus comprising, means for radiating through a microwave lens a plurality of microwave beams angularly disposed from and about the lens axis and defined by lines of direction which may be divided into components along and across said desired heading, said radiated means being adapted to receive through said lens the energy from each radiated beam which is returned from an object, the Doppler shift of the returned energy frequency spectra associated with each beam being characteristic of the vehicle velocity along the respective beam relative to said object, and means for combining the received spectra to provide at least two translational spectra which are characteristic of the vehicle velocity respectively along and across said heading.

8. In a Doppler radar system supported by a vehicle which is to move with a desired heading in a horizontal plane, apparatus comprising, means for radiating through a microwave lens a plurality of microwave beams angularly disposed from and about the lens axis and defined by respective lines of direction which have components expressible along and across said heading and along a vertical axis, means for receiving through said lens the energy from each radiated beam which is returned from an object, the Doppler shift of the reflected energy frequency spectrum associated with each beam being characteristic of the vehicle velocity along the respective beam relative to said object, means for combining the received spectra to derive three translational spectra characteristic of a translational velocity component of the vehicle respectively along and across said heading, and along said vertical axis.

9. In a Doppler radar system supported by a vehicle which is to move with a desired heading in the horizontal plane, apparatus comprising, means for radiating through a microwave lens three microwave beams equiangularly disposed from the lens axis, a first and third of said beams being disposed about the lens axis substantially 90 degrees from the second thereof, means for receiving through said lens the energy from each radiated beam which is returned from an object, the Doppler shift of the returned energy frequency spectrum associated with each beam being characteristic of the vehicle velocity along the respective beam relative to said object, and means for combining the received spectra to derive at least two translational signals each characteristic of the vehicle velocity respectively along and across said heading.

10. In a Doppler radar system supported by a movable vehicle, apparatus comprising, a microwave lens means for radiating through a microwave lens a plurality of microwave beams angularly disposed from and about the lens axis, means for receiving through said lens the energy from each radiated beam which is returned from an object, the Doppler shift of the returned energy frequency spectrum associated with each beam being characteristic of the vehicle velocity along the respective beams relative to said object, and means for combining the received spectra to derive a plurality of translational signals indicative of translational velocity components of the vehicle along different axes of a space platform co-ordinate system.

11. In a Doppler radar system supported by a movable vehicle apparatus comprising, means for radiating through a microwave lens a plurality of microwave beams angularly disposed from and about the lens axis, means for receiving through said lens the energy from each radiated beam which is returned from an object, the Doppler shift of the returned energy frequency spectrum associated with each beam being characteristic of the vehicle velocity along the respective beam relative to said object, means for combining the received spectra to derive a plurality of translational spectra indicative of translational velocity components of the vehicle along different axes of a space platform co-ordinate system, and means for deriving a single frequency signal in response to each translational spectrum which is representative of the respective translational velocity component.

12. A Doppler radar system supported by a movable vehicle comprising, a source of microwave energy, a microwave lens having focal points which define a circle about the lens axis whereby rays of energy emanating from said focal points and incident upon one surface of said lens emerge from the other surface thereof oriented at a predetermined angle relative to said axis, a plurality of radiators disposed substantially upon said circle, directional coupling means between said radiators and source of microwave energy whereby energy for radiation is coupled from the latter source and energy received by said radiators is coupled to signal amplifying means, the Doppler frequency shift of each received signal spectrum being characteristic of the velocity component of said vehicle along the direction of the radiated beam of the respective radiator, means for combining the received spectra to derive a plurality of translational spectra indicative of translational velocity components of the vehicle along different axes of a space platform co-ordinate system, and means for deriving a single frequency signal in response to each translational spectrum which is representative of the respective translational velocity component.

13. A vehicle-contained Doppler system comprising, a symmetrical zoned microwave lens having a plurality of focal points which define a circle centered on and orthogonal to the lens axis whereby beams of energy from a plurality of microwave horns positioned substantially along said circle emerge from the image side of said lens equiangularly oriented relative to said axis and separated about said axis by angles related to the angular disposition of said horns on said circle, microwave transmitting and receiving means, directional couplers which couple energy from the transmitting means to each horn and couple received energy from each horn to the receiving means, the Doppler-shifted frequency spectrum of energy associated with each beam returned from a surface being characteristic of the vehicle velocity along the respective beam relative to said surface, means for rendering said transmitting means and receiving means operative during alternating mutually exclusive time intervals, means for transposing the Doppler-shifted frequency spectra of said returned energy to frequencies about respective lower frequency carrier signals, respective sharp filters energized by said transposing means for providing output signals which include only the transposed Doppler-shifted frequency spectra, means for combining the transposed Doppler-shifted frequency spectra to derive a plurality of translational spectra each indicative of a translational velocity component of the vehicle along a different axis of a fixed axes co-ordinate system, means for deriving a single frequency tracking signal for each translational spectrum which divides the latter into equal power spectra, and means for combining the tracking signals to yield a signal characteristic of the movement of said vehicle.

14. An aircraft Doppler radar system comprising, a plurality of microwave radiators within said aircraft, a microwave lens positioned to focus microwave energy from each of said radiators into respective collimated beams oriented in different directions which impinge upon a surface and direct returned energy from each beam to the respective radiator, the Doppler-shifted frequency spectrum of the returned energy being characteristic of the aircraft velocity along the associated beam relative to said surface, transmitting means, receiving means, directional coupling means for directing energy for radiation from said transmitting means to each radiator, and for directing returned energy to said receiving means, means for rendering said transmitting means and receiving means operative during mutually exclusive time intervals, the rate of switching there-between being related to the aircraft altitude, means for combining the Doppler-shifted frequency spectra to derive a plurality of translational spectra each indicative of a translational velocity component of the vehicle along a different axis of a fixed axes co-ordinate system, means for deriving a single frequency signal from each translational spectrum, and means for combining the latter signals to provide a signal indicative of the aircraft velocity.

15. In a Doppler radar system appartus comprising, a microwave dielectric lens having focal points which define a circle normal to the axis of said lens, a supporting frame secured to said lens, a plurality of horn radiators secured to said frame whereby the mouths of said horns lie substantially along said circle and are directed to illuminate said lens with the axes of the horns intersecting the lens axis at the lens center, the lens focusing energy emanating from said horns into a corresponding plurality of collimated beams angularly oriented to and disposed about the lens axis and focusing energy returned from the respective beams upon the respective horn mouths, means for energizing said horns with high frequency energy, and means for processing the returned energy incident upon the horn mouths to produce a plurality of translational spectra each indicative of a translational velocity component along a different axis of a fixed axis co-ordinate system.

16. Apparatus as in claim 15 wherein four horns are symmetrically disposed about the lens axis at 90 degree intervals to provide four beams whose projections in the plane of said circle are spaced by 90 degrees.

17. In a Doppler radar system apparatus comprising, a microwave dielectric lens attached to a supporting frame with a reflecting surface at the opposite end substantially parallel to said lens, focal points of the lens defining a circle normal to the lens axis and lying on the same side of said reflecting surface as said lens, a plurality of horn radiators with their mouths disposed substantially along said circle and directed to illuminate said reflector with the horn axes aligned whereby lines passing through the lens center and intersecting the reflecting surface at the same point as the respective horn axes forms an angle with said reflecting surface equal to that between the latter and the horn axis, the lens focusing energy reflected from the latter surface into a plurality of colliminated beams angularly oriented to and disposed about the lens axis and focusing energy returned from the beams upon the respective horn mouths via the reflecting surface, means for energizing the horns with high frequency energy, and means for processing the returned energy to produce a plurality of translational spectra each indicative of a translational velocity component along a different axis of a fixed axis co-ordinate system.

18. Apparatus as in claim 17 wherein said plurality of horns comprise, a pair of horns with their mouths on diametrically opposite points of said circle, and a third horn with its mouth positioned 90 degrees from each horn in said pair.

19. In a Doppler radar system apparatus comprising, a zoned microwave dielectric lens secured to a support frame, the lens having focal points which define a circle normal to the lens axis, a plurality of conical horn radiators secured to said support frame with their mouths substantially along said circle, a directional coupler turnstile junction coupled to each horn and adapted to receive energy for radiation and provide at the input of said horn circularly polarized energy for radiation thereby and adapted to couple circularly polarized reflected energy returned to said horn to an adjoining microwave crystal mixer, a power divider adapted to be energized by input power for radiation and supply substantially equal amounts of power to the respective directional coupler turnstile junctions associated with the horns, local oscillator power dividing means adapted to be energized by a local oscillator signal and direct substantially equal amounts of local oscillator signal power to respective mixers associated with each of said directional coupler turnstile junctions and filter means interposed between each of the latter mixers and said local oscillator power dividing means for selectively passing only said local oscillator signal and means for processing the intermediate frequency signals produced by said mixers to produce a plurality of translational spectra each indicative of a translational velocity component along a different axis on a fixed axis co-ordinate system.

20. A vehicle-contained Doppler system comprising, a symmetrical microwave lens having a plurality of focal points which define a circle centered on and orthogonal to the lens axis whereby beams of energy from a plurality of microwave horns positioned substantially along said circle emerge from the image side of said lens equiangularly oriented relative to said axis and separated about said axis by angles related to the angular disposition of said horns on said circle, microwave transmitting and receiving means, directional couplers for coupling energy from said transmitting means to each horn and for coupling received energy from each horn to said receiving means, the Doppler-shifted frequency spectrum of energy associated with each beam returned from a surface being characteristic of the vehicle velocity along the respective beam relative to said surface, means for rendering said transmitting means and receiving means operative during alternating mutually exclusive time intervals, means for transposing the Doppler-shifted frequency spectra of said reflected energy to frequencies about respective lower frequency carrier signals, respective sharp filters energized by said transposing means for providing output signals which include only the transtransposed Doppler-shifted frequency spectra, means for combining the transposed Doppler-shifted frequency spectra to derive a plurality of translational spectra each indicative of a translational velocity component of the vehicle along one axis of a fixed axes co-ordinate system, means for deriving a single frequency tracking signal for each translational spectrum which divides the latter into equal power spectra, and means for combining said tracking signals to yield a signal characteristic of the movement of said vehicle.

21. In a pulsed Doppler radar system apparatus comprising, a source of coherently-generated high frequency transmitted and local oscillator signals, means for radiating a plurality of differently oriented pencil beams of high frequency energy when energized by said transmitted signal, means for selectively energizing said radiating means with said transmitted signal to radiate pulsed high frequency energy confined within said plurality of pencil beams, means for receiving reflections of the radiated pulsed energy, and means for mixing the received reflected energy from each pencil beam with said local oscillator signal to provide a different pulse train for each pencil beam.

22. A Doppler radar system comprising, means for coherently generating microwave power and local oscillator signals, a microwave lens, means for dividing said microwave power for radiation through said microwave lens in the form of a plurality of pencil beams, means for receiving through said microwave lens the microwave energy from each of said pencil beams returned from a scattering surface, and means for mixing said microwave energy so returned from each beam with said local oscillator signal.

23. A Doppler radar system comprising, a microwave dielectric lens, said lens being characterized by a plurality of co-planar focal points, at least three directional radiators disposed at different ones of said focal points and arranged for the exchange of microwave energy through said microwave dielectric lens to define a plurality of distinctive and angularly separated radiation beams, a local oscillator, and means for mixing microwave energy received by said directional radiators through said microwave dielectric lens with a signal from said local oscillator.

24. A Doppler radar system comprising, a microwave dielectric lens secured to a support frame, said lens having focal points defining a circle normal to the lens axis, a plurality of directional radiators secured to said support frame and arranged about said circle for the exchange of microwave energy through said lens, means for coherently generating microwave power and a local oscillator signal, a plurality of mixers each associated with a respective one of said directional radiators, means for dividing said microwave power for application to said directional radiators for transmission therefrom, means for selectively applying energy received by said directional radiators through said lens to the respective mixer, and means for applying said local oscillator signal to each of said mixers.

25. A Doppler radar system in accordance with claim 24 wherein said directional radiators are each arranged with respect to said lens to exchange microwave energy in a distinct sharply defined beam.

26. A Doppler radar system in accordance with claim 24 wherein said plurality of directional radiators are arranged with respect to said lens to define a like plurality of angularly separated pencil beams.

References Cited in the file of this patent

UNITED STATES PATENTS

| | | |
|---|---|---|
| 1,864,638 | Chilowsky | June 28, 1932 |
| 2,422,064 | Anderson | June 10, 1947 |
| 2,455,639 | Anderson | Dec. 7, 1948 |
| 2,638,588 | Riblet | May 12, 1953 |
| 2,677,126 | Webb | Apr. 27, 1954 |
| 2,736,894 | Kock | Feb. 28, 1956 |

UNITED STATES PATENT OFFICE
CERTIFICATE OF CORRECTION

Patent No. 3,102,263                                  August 27, 1963

Maurice A. Meyer

It is hereby certified that error appears in the above numbered patent requiring correction and that the said Letters Patent should read as corrected below.

Column 2, line 7, for "veloicty" read -- velocity --; same column 2, line 26, for "lage" read -- lag --; column 7, line 11, for "·$V_y$+cos P·cos R·V" read -- ·$V_y$+cos P·cos R·$V_z$ --; column 13, line 13, for "junctions 82 function" read -- junction 82 functions --; line 14, before "transmitter" insert -- power divider to direct energy to be radiated from --; column 14, line 47, for "ararngement" read -- arrangement --; column 20, line 33, for "suported" read -- supported --; column 23, line 45, for "colliminated" read -- collimated --; column 24, line 34, strike out "trans-".

Signed and sealed this 5th day of May 1964.

(SEAL)
Attest:

ERNEST W. SWIDER                                                EDWARD J. BRENNER

Attesting Officer                                         Commissioner of Patents